US012612475B2

(12) United States Patent
Song et al.

(10) Patent No.: US 12,612,475 B2
(45) Date of Patent: Apr. 28, 2026

(54) POLYETHYLENE FOR PREPARING FIBER AND PREPARATION METHOD OF THE SAME

(71) Applicant: LG CHEM, LTD., Seoul (KR)

(72) Inventors: Christine Jisoo Song, Daejeon (KR); Jiwon Yoon, Daejeon (KR); Yi Young Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 529 days.

(21) Appl. No.: 18/273,677

(22) PCT Filed: Feb. 18, 2022

(86) PCT No.: PCT/KR2022/002424
§ 371 (c)(1),
(2) Date: Jul. 21, 2023

(87) PCT Pub. No.: WO2022/177348
PCT Pub. Date: Aug. 25, 2022

(65) Prior Publication Data

US 2024/0101729 A1 Mar. 28, 2024

(30) Foreign Application Priority Data

Feb. 19, 2021 (KR) ........................ 10-2021-0022711
Feb. 17, 2022 (KR) ........................ 10-2022-0020900

(51) Int. Cl.
*C08F 210/16* (2006.01)
*C08F 4/659* (2006.01)
*C08F 10/02* (2006.01)

(52) U.S. Cl.
CPC .......... *C08F 10/02* (2013.01); *C08F 4/65916* (2013.01); *C08F 210/16* (2013.01); *C08F 2420/01* (2013.01); *C08F 2500/03* (2013.01); *C08F 2500/07* (2013.01); *C08F 2500/12* (2013.01)

(58) Field of Classification Search
CPC .... C08F 210/16; C08F 10/02; C08F 2500/12; C08F 2500/03; C08F 2500/07
See application file for complete search history.

(56) References Cited

U.S. PATENT DOCUMENTS 5,696,044 A * 12/1997 Zakharov ............... B01J 31/143 502/134
6,506,866 B2 * 1/2003 Jacobsen ................. C08F 10/00 526/348
6,573,343 B1 * 6/2003 Follestad ............ C08F 297/083 526/66
6,787,608 B2 * 9/2004 VanDun .................. C08F 10/02 525/240
6,809,056 B1 * 10/2004 Choi ....................... C08F 10/02 502/103
6,989,344 B2 * 1/2006 Cann ....................... C08F 10/00 502/154
8,067,518 B2 * 11/2011 Davey ................... C08F 210/16 526/348
8,450,426 B2 * 5/2013 Palmlof .................. C08L 23/02 525/240
8,679,602 B2 * 3/2014 Michie, Jr. ............ C08F 210/16 526/348.2
8,835,582 B2 * 9/2014 Cann ....................... C08F 10/02 502/132
8,846,188 B2 * 9/2014 Fantinel ..................... C08J 5/18 526/170
8,962,755 B2 * 2/2015 Wang ...................... C08L 23/08 526/348
9,732,172 B2 * 8/2017 Kim ...................... C08F 4/6592
9,758,653 B2 * 9/2017 Wang .................. C08L 23/0815
9,862,786 B2 * 1/2018 Morrison .............. C08F 210/16
10,266,626 B2 * 4/2019 Sung ..................... C08F 210/16
10,323,110 B2 * 6/2019 Sun ....................... C08F 210/16
10,619,036 B2 * 4/2020 Tupe .................. C08L 23/0815
10,766,988 B2 * 9/2020 Sun ....................... C08F 210/16
10,815,324 B2 * 10/2020 Sun ....................... C08F 210/16
11,208,512 B2 * 12/2021 Martin ............... B29C 49/0006
11,214,669 B2 * 1/2022 Kim .................... C08L 23/0815
11,767,385 B2 * 9/2023 Liu ....................... C08F 210/16 526/170
11,945,889 B2 * 4/2024 Liu ............................ C08J 5/18
11,952,444 B2 * 4/2024 Cirriez ................ C08F 4/65916
12,012,504 B2 * 6/2024 Tran .......................... C08F 2/34
2006/0287449 A1 12/2006 Miyamoto et al.

(Continued)

FOREIGN PATENT DOCUMENTS

| | | | |
|---|---|---|---|
| CN | 102791746 | A | 11/2012 |
| CN | 108707266 | A | 10/2018 |
| CN | 111454300 | A | 7/2020 |
| JP | H06-25911 | A | 2/1994 |

(Continued)

OTHER PUBLICATIONS

International Search Report and Written Opinion dated Jun. 2, 2022, issued in corresponding International Patent Application No. PCT/KR2022/002424.
Alexakis, "Mild Protection and Deprotection of Alcohols as Ter-Butyl Ethers in the Field of Pheromone Synthesis," Tetrahedron Letters, Pergamon Press PLC, vol. 29, No. 24, pp. 2951-2954 (1988).

(Continued)

*Primary Examiner* — Rip A Lee
(74) *Attorney, Agent, or Firm* — Morgan, Lewis & Bockius LLP

(57) ABSTRACT

The present disclosure relates to a polyethylene suitable for preparing fibers with enhanced yellow index and filterability in the spinning process by having improved aging lifetime of the polyethylene, and a preparation method of the same.

12 Claims, No Drawings

(56) References Cited

U.S. PATENT DOCUMENTS

| | | | | |
|---|---|---|---|---|
| 2009/0004489 | A1 | 1/2009 | Laiho et al. | |
| 2010/0292418 | A1* | 11/2010 | Jorgensen | C08F 10/00 526/116 |
| 2011/0212315 | A1* | 9/2011 | Fantinel | C08F 10/00 526/348 |
| 2012/0329966 | A1 | 12/2012 | Kwon et al. | |
| 2013/0046068 | A1 | 2/2013 | Kwon et al. | |
| 2014/0206828 | A1 | 7/2014 | Kwon et al. | |
| 2015/0225497 | A1 | 8/2015 | Kim et al. | |
| 2017/0291969 | A1 | 10/2017 | Lee et al. | |
| 2018/0223009 | A1 | 8/2018 | Kim et al. | |
| 2019/0169325 | A1 | 6/2019 | Lee et al. | |
| 2020/0010584 | A1 | 1/2020 | Hong et al. | |
| 2023/0287160 | A1* | 9/2023 | Jeong | C08F 210/16 |

FOREIGN PATENT DOCUMENTS

| | | | | | |
|---|---|---|---|---|---|
| JP | H09-095507 | A | | 4/1997 | |
| JP | 2003-137929 | A | | 5/2003 | |
| JP | 2005-029731 | A | | 2/2005 | |
| JP | 2006-206500 | A | | 8/2006 | |
| JP | 2010-202628 | A | | 9/2010 | |
| JP | WO2013/118504 | A1 | | 8/2013 | |
| JP | 2015-089937 | A | | 5/2015 | |
| JP | 6803928 | B2 | | 12/2020 | |
| JP | 6829166 | B2 | | 2/2021 | |
| KR | 100371405 | B1 | * | 2/2003 | C08F 10/02 |
| KR | 10-2011-0101386 | A | | 9/2011 | |
| KR | 10-1840127 | B1 | | 3/2018 | |
| KR | 20180040998 | A | * | 4/2018 | C08F 4/42 |
| KR | 20180055558 | A | * | 5/2018 | C08F 210/02 |
| KR | 10-2039073 | B1 | | 10/2019 | |
| KR | 10-2022-0041669 | A | * | 4/2022 | C09F 10/02 |
| RU | 2529020 | C2 | | 9/2014 | |
| RU | 2670752 | C2 | | 10/2018 | |
| WO | WO-2006045550 | A1 | * | 5/2006 | C08L 23/06 |
| WO | 2006/074694 | A1 | | 7/2006 | |
| WO | WO-2007045415 | A1 | * | 4/2007 | C08L 23/04 |
| WO | WO-2016167547 | A1 | * | 10/2016 | C08F 210/16 |
| WO | WO-2016167548 | A1 | * | 10/2016 | C08F 210/02 |
| WO | WO-2016167568 | A1 | * | 10/2016 | C08F 210/16 |
| WO | 2020/171525 | A1 | | 8/2020 | |

OTHER PUBLICATIONS

KP Bryliakov, "Post-metallocene catalysts for olefin polymerization," Russian Chemical Reviews 2007, vol. 76, No. 3, pp. 279-304.

Chatterjee "Handbook of Industrial Polyethylene and Technology—Definitive Guide to Manufacturing, Properties, Processing, Applications and Markets," Scrivener Publishing (2018) pp. 793-820.

Office Action dated Apr. 24, 2025, of the corresponding Chinese Patent Application No. 202280014008.6.

Office Action dated Apr. 10, 2025, of the corresponding Russian Patent Application No. 2023123846.

Extended European Search Report dated Jun. 27, 2024 of the corresponding European Patent Application No. 22756546.2.

* cited by examiner

POLYETHYLENE FOR PREPARING FIBER AND PREPARATION METHOD OF THE SAME

CROSS CITATION WITH RELATED APPLICATION(S)

This application claims the benefits of Korean Patent Applications No. 10-2021-0022711 filed on Feb. 19, 2021 and No. 10-2022-0020900 filed on Feb. 17, 2022 with the Korean Intellectual Property Office, the disclosure of which is incorporated herein by reference in its entirety.

TECHNICAL FIELD

The present disclosure relates to a polyethylene suitable for preparing fibers with enhanced yellow index and filterability in the spinning process by having improved aging lifetime, and a preparation method of the same.

BACKGROUND

In order to prepare a high tenacity fiber such as a rope, a fishing net, etc., a high-density polyethylene is used, and the properties of high draw, high tenacity, etc. are required for the high-density polyethylene.

In the fiber product, it is known that the narrower the molecular weight distribution of the high-density polyethylene, the better the mechanical properties. That is, if the high-density polyethylene has the narrow molecular weight distribution, it has a high draw ratio, and may have high tenacity due to high drawing. However, if the molecular weight distribution of high-density polyethylene is too narrow, filterability may be deteriorated.

Olefin polymerization catalyst systems for preparing such a high-density polyethylene or a linear low-density polyethylene can be classified into a Ziegler-Natta catalyst system and a metallocene catalyst system, and these two catalyst systems have been developed according to their respective characteristics.

Meanwhile, in the method of preparing a polyethylene using a commercially widely applied Ziegler-Natta catalyst, it is difficult to obtain a polymer having a uniform molecular weight, and the molecular weight distribution is wide.

Although the polyethylene having a wide molecular weight distribution has good filterability, it has disadvantages in that mechanical properties are deteriorated, and low molecular weight portions are eluted during processing, thereby reducing the original properties of resin.

In order to solve these problems, suggested is a method of preparing a polyethylene having a narrow molecular weight distribution using a metallocene catalyst system. However, in order to be applied for the existing commercial processes such as a slurry process and a gas-phase process, metallocene should be supported on an appropriate support, but the supported metallocene catalysts used so far have disadvantages in that the molecular weight distribution is widened and the catalytic activity is lowered.

In particular, a Ziegler-Natta catalyst system in which titanium tetrachloride ($TiCl_4$) is used as polymerization active sites is widely used to prepare a high-density polyethylene or a linear low-density polyethylene. A polymer obtained from this catalyst, that is, polyethylene, contains residues of halogen compounds (e.g., HCl), which are catalyst components, and this causes corrosion of metal materials such as molding machines and promotes a decomposition reaction of the polyethylene, acting as a major cause of discoloration.

A conventional technique for solving this is a technique of adding a neutralizing agent (acid scavenger) to the extrusion process to react with the catalyst residue [Holzner, A., and Chmil, K., Acid Scavenger, Plastic additives handbook, Zweifel, H., and Maier, R. (Eds.), 6th ed, Hanser: Munich, 2009], and the most common additive used in this case is metal stearate (e.g., calcium stearate). However, when low-denier (thin) fibers are manufactured using the polyethylene obtained in this way, there is a disadvantage in that a breakage of yarn occurs due to metal inorganic materials in the spinning process. In addition, for the purpose of preventing the breakage of yarn, a mesh filter is added at the bottom of the extruder die during the fiber spinning process to filter out metal inorganic materials and other foreign substances. At this time, if the filter pressure due to foreign substances increases, the filter replacement cycle may be shortened, thereby reducing the process yield.

Accordingly, in order to solve the above disadvantages, there is a continuing need to develop a polyethylene resin composition suitable for preparing fibers or nonwoven fabrics with enhanced yellow index and filterability in the spinning process by having improved aging lifetime of the polyethylene.

DETAILED DESCRIPTION OF THE INVENTION

Technical Problem

In the present disclosure, there is provided a polyethylene suitable for preparing fibers with improved yellow index and enhanced filterability in the spinning process.

In addition, there is provided a preparation method of the above-described polyethylene for preparing fibers.

In addition, there is also provided a spun-bonded nonwoven fabric formed of the above-described polyethylene fibers.

Technical Solution

According to one embodiment of the present disclosure, there is provided a polyethylene satisfying the following: a melt index (ASTM D 1238, 190° C., 2.16 kg) is 15 g/10 min to 40 g/10 min, a melt flow rate ratio (MFRR, $MI_5/MI_{2.16}$) is 3 or less, a content of alkaline earth metals and transition metals measured by inductively coupled plasma (ICP) spectroscopy is 0.8 ppm or less, and a halogen content measured by combustion ion chromatography (IC) is 5 ppm or less.

In addition, there is provided a preparation method of the above-described polyethylene for preparing fibers.

In addition, there is also provided a spun-bonded nonwoven fabric formed of the above-described polyethylene fibers.

Advantageous Effects

According to the present disclosure, it is possible to provide fibers or nonwoven fabrics with enhanced yellow index and filterability in the spinning process by having improved polyethylene aging lifetime.

DETAILED DESCRIPTION OF THE EMBODIMENTS

In the present disclosure, the terms "the first", "the second", and the like are used to describe a variety of components, and these terms are merely employed to distinguish a certain component from other components.

The terminology used herein is for the purpose of describing particular embodiments only, and is not intended to limit the present invention. The singular forms are intended to include the plural forms as well, unless the context clearly indicates otherwise. In this disclosure, the terminology "include", "comprise", or "have" is used to describe stated features, numbers, steps, components, or combination thereof, and do not preclude the addition of one or more other features, numbers, steps, components, or combinations thereof.

The terminology "about" or "substantially" is intended to have meanings close to numerical values or ranges specified with an allowable error and intended to prevent accurate or absolute numerical values disclosed for understanding of the present invention from being illegally or unfairly used by any unconscionable third party.

In addition, "part by weight" as used herein refers to a relative concept of a ratio of the weight of the remaining material based on the weight of a specific material. For example, in a mixture containing 50 g of material A, 20 g of material B, and 30 g of material C, the amounts of material B and C based on 100 parts by weight of material A are 40 parts by weight and 60 parts by weight, respectively.

In addition, "wt % (% by weight)" refers to an absolute concept of expressing the weight of a specific material in percentage based on the total weight. In the above-described mixture, the contents of material A, B and C based on 100% of the total weight of the mixture are 50 wt %, 20 wt % and 30 wt %, respectively. At this time, the sum of the contents of each component does not exceed 100 wt %.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present invention will be described in detail.

According to one embodiment of the present disclosure, there is provided a polyethylene suitable for preparing fibers with improved yellow index and enhanced filterability in the spinning process.

Specifically, the polyethylene of the present disclosure satisfies the following: a melt index (ASTM D 1238, 190° C., 2.16 kg) is 15 g/10 min to 40 g/10 min, a melt flow rate ratio (MFRR, $MI_5/MI_{2.16}$) is 3 or less, a content of alkaline earth metals and transition metals measured by inductively coupled plasma (ICP) spectroscopy is 0.8 ppm or less, and a halogen content measured by combustion ion chromatography (IC) is 5 ppm or less.

In particular, the polyethylene, as will be described later, fundamentally blocks halogen compounds in the polyethylene by using a specific metallocene catalyst, thereby improving the yellow index in the preparation of bi-component fibers and enhancing the filterability in the spinning process.

Specifically, the polyethylene may have the melt index (ASTM D 1238, 190° C., 2.16 kg) of 16 g/10 min or more, 17 g/10 min or more, 18 g/10 min or more, 18.5 g/10 min or more, or 18.9 g/10 min or more, and 38 g/10 min or less, 35 g/10 min or less, 33 g/10 min or less, 30 g/10 min or less, or 29.7 g/10 min or less.

This optimizes the weight average molecular weight of the polyethylene, minimizes the occurrence of the breakage of yarn in the spinning process when manufacturing low-denier (thin) fibers, and lowers the processing load of the mesh filter to improve filterability and process yield. For reference, denier is an international unit used to indicate the thickness of yarn. When a standard length of 9,000 m weighs a unit weight of 1 g, it is defined as 1 denier.

In addition, the polyethylene may preferably have the melt flow rate ratio (MFRR, $MI_5/MI_{2.16}$) of 2 to 3.

The MFRR is a value of $MFR_5$ measured at 190° C. under a load of 5 kg divided by $MFR_{2.16}$ measured at 190° C. under a load of 2.16 kg according to ASTM D 1238.

More specifically, the melt flow rate ratio (MFRR, $MFR_5/MFR_{2.16}$) of the polyethylene measured at 190° C. according to ASTM D1238 may be 2.2 or more, 2.3 or more, 2.4 or more, or 2.5 or more, and 2.90 or less, 2.85 or less, 2.7 or less, or 2.56 or less.

When having such a narrow melt flow rate ratio range, the polyethylene of the present disclosure can achieve excellent filterability and improved process yield.

In addition, a content of alkaline earth metals and transition metals measured by inductively coupled plasma (ICP) spectroscopy is 0.8 ppm or less, or 0 to 0.8 ppm. Preferably, the content of alkaline earth metals and transition metals may be 0.5 ppm or less, 0.1 ppm or less, 0.08 ppm or less, 0.05 ppm or less, 0.03 ppm or less, or 0.01 ppm or less. The polyethylene is characterized in that residual components of metal inorganic substances such as alkaline earth metals and transition metals derived from the polymerization process are not included or minimized. However, in a practical aspect, the content of alkaline earth metals and transition metals in the polyethylene may be 0.0001 ppm or more, 0.0002 ppm or more, 0.0005 ppm or more, 0.0008 ppm or more, 0.001 ppm or more, 0.002 ppm or more, 0.005 ppm or more, or 0.008 ppm or more. Preferably, the content of alkaline earth metals and transition metals in the polyethylene may be 0.

The polyethylene of the present disclosure reduces the content of alkaline earth metals and transition metals as described above or does not contain the residues of alkaline earth metals and transition metals, thereby preventing the occurrence of a breakage of yarn due to metal inorganic materials in the spinning process when manufacturing low-denier (thin) fibers.

Specifically, the polyethylene may be measured by applying various methods known as residue analysis methods for inorganic substances, and a specific measurement method may be understood with reference to Examples to be described later. For example, the residue analysis on the inorganic substances of the polyethylene may be performed using an inductively coupled plasma (ICP) spectrometer (ICP-OES, Optima 8300DV). For example, the polyethylene is heated at 200° C. for 1 hour, heated at 400° C. for 2 hours, and then heated at 650° C. for 3 hours. Thereafter, inorganic substances such as alkaline earth metals and transition metals may be analyzed by inductively coupled plasma (ICP) spectroscopy.

In addition, the polyethylene may have a halogen content measured by combustion ion chromatography (IC) of 5 ppm or less, or 0 to 5 ppm. Preferably, the halogen content may be 3.5 ppm or less, 3 ppm or less, 2.5 ppm or less, 2 ppm or less, 1.8 ppm or less, 1.5 ppm or less, 1.3 ppm or less, 1.2 ppm or less, 1.1 ppm or less, 1 ppm or less, 0.8 ppm or less, 0.5 ppm or less, 0.3 ppm or less, 0.1 ppm or less, 0.08 ppm or less, 0.05 ppm or less, 0.03 ppm or less, or 0.01 ppm or less. The polyethylene is characterized in that the residual halogen derived from the polymerization process is not included or minimized. However, in a practical aspect, the halogen content in the polyethylene may be 0.0001 ppm or more, 0.0002 ppm or more, 0.0005 ppm or more, 0.0008 ppm or more, 0.001 ppm or more, 0.002 ppm or more, 0.005 ppm or more, or 0.008 ppm or more. Preferably, the halogen content such as chlorine (Cl) in the polyethylene may be 0.

As such, the polyethylene of the present disclosure can prevent discoloration by reducing residues of halogen compounds or by not containing halogen substances such as chlorine, thereby preventing corrosion of metal materials such as molding machines and decomposition of the polyethylene according to an oxidation reaction.

Specifically, the polyethylene may be measured by applying various methods known as residue analysis methods for halogen substances, and a specific measurement method may be understood with reference to Examples to be described later. For example, the residue analysis on the halogen substances of the polyethylene may be performed using combustion ion chromatography (ICS-2100/AQF-2100H). For example, halogen substances of the polyethylene such as chlorine (Cl) may be analyzed by combustion ion chromatography at a combustion temperature of 900° C. to 1000° C.

In the case of the polyethylene according to one embodiment of the present disclosure, the weight average molecular weight and the molecular weight distribution are optimized, and the occurrence of the breakage of yarn in the spinning process is minimized when manufacturing low-denier (thin) fibers, which may lower the processing load of the mesh filter to improve filterability and process yield.

Specifically, the polyethylene may have a molecular weight distribution (Mw/Mn) of 2.0 to 2.6, and preferably 2.2 or more, 2.3 or more, 2.32 or more, or 2.35 or more, and 2.55 or less, 2.50 or less, 2.48 or less, 2.45 or less, or 2.39 or less.

In addition, the polyethylene may have a weight average molecular weight of 38000 g/mol to 65000 g/mol, and preferably 38500 g/mol or more, 39000 g/mol or more, 39500 g/mol or more, or 40000 g/mol or more, and 63000 g/mol or less, 60000 g/mol or less, 58000 g/mol or less, 55000 g/mol or less, or 50000 g/mol or less.

In the present disclosure, since the polyethylene has the narrow molecular weight distribution while having the optimized melt index and weight average molecular weight as described above, both excellent mechanical properties and tensile strength can be satisfied.

In the present disclosure, the number average molecular weight (Mn), the weight average molecular weight (Mw) and the molecular weight distribution are molecular weights converted with standard polystyrene measured by gel permeation chromatography (GPC, manufactured by Water). However, the weight average molecular weight is not limited thereto and may be measured by other methods known in the art to which the present invention pertains.

For example, a polyethylene sample was evaluated using a Polymer Laboratories PLgel MIX-B 300 mm long column and PL-GPC220 instrument manufactured by Waters. At this time, a measurement temperature was 160° C., and 1,2,4-trichlorobenzene was used for a solvent at a flow rate of 1 mL/min. And the sample was supplied with a concentration of 10 mg/10 mL in an amount of 200 μL. Mw and Mn were obtained using a calibration curve formed using a polystyrene standard. 9 kinds of the polystyrene standard were used with the molecular weight of 2000 g/mol, 10000 g/mol, 30000 g/mol, 70000 g/mol, 200000 g/mol, 700000 g/mol, 2000000 g/mol, 4000000 g/mol, and 10000000 g/mol.

Further, the polyethylene may be a high-density polyethylene (HDPE) having a density (ASTM D 1505, 23° C.) of 0.945 g/$cm^3$ to 0.965 g/$cm^3$.

More specifically, the density of the polyethylene may be 0.948 g/$cm^3$ or more, 0.949 g/$cm^3$ or more, or 0.950 g/$cm^3$ or more, and 0.960 g/$cm^3$ or less, 0.958 g/$cm^3$ or less, 0.955 g/$cm^3$ or less, or 0.954 g/$cm^3$ or less.

The polyethylene according to one embodiment of the present disclosure may be a copolymer of ethylene; and at least one comonomer selected from the group consisting of propylene, 1-butene, 1-hexene, 4-methyl-1-pentene and 1-octene. More specifically, the polyethylene according to one embodiment of the present disclosure may be a copolymer of ethylene and 1-butene.

Specifically, the comonomer-derived repeating unit may be included in an amount of about 5 mol % or less, or about 0 to about 5 mol % of the polyethylene. When included within the above range, the polyethylene may exhibit better filterability. Preferably, the comonomer-derived repeating unit may be included in an amount of about 4.8 mol % or less, 4.5 mol % or less, 4.2 mol % or less, 4 mol % or less, 3.8 mol % or less, or 3.5 mol % or less based on a total weight of the polyethylene. However, in consideration of the excellent effect of improving filterability by the amount control of the comonomer-derived repeating unit, the comonomer-derived repeating unit may be included in an amount of about 0.2 mol % or more, about 0.5 mol % or more, 1 mol % or more, 1.2 mol % or more, 1.5 mol % or more, 1.8 mol % or more, or 2 mol % or more based on a total weight of the polyethylene.

For example, the comonomer-derived repeating unit may be included in an amount obtained by reacting 10 mL/min or less, or 0 to 10 mL/min of the comonomer with 10 kg/hr of ethylene in the copolymerization step to be described later.

The polyethylene of the present disclosure satisfying the above physical properties is characterized in that halogen substances or residual components of metal inorganic substances such as alkaline earth metals and transition metals derived from the polymerization process are not included or minimized. In addition, the melt index, melt flow rate ratio, and narrow molecular weight distribution are optimized, so that the polyethylene can be very preferably used in the manufacture of bi-component fibers or nonwoven fabrics with enhanced yellow index and filterability in the spinning process by having improved aging lifetime.

In order to confirm the degree of decrease in tensile strength after a certain period of time and the degree of discoloration after oxidation, aging properties of the polyethylene of the present disclosure may be evaluated by preparing a fiber (resin) in a conventional method and storing it in an air convection oven at 80° C. for at least 10 days. In this case, the physical properties measured before putting in the 80° C. oven were defined as the measured values before aging, and the physical properties measured after 10 days or more in the 80° C. oven were defined as the measured values after aging.

Specifically, in order to confirm the degree of discoloration appearing after oxidation of the polyethylene for a certain period of time, the yellow index (Y.I) may be measured according to ASTM E 313. For example, the yellow index (Y.I) may be measured using a COH-400 spectrophotometer (NIPPON DENSHOKU INDUSTRIES), and a specific measurement method may be understood with reference to Examples to be described later.

The polyethylene according to one embodiment of the present disclosure may have a ratio (%) of the difference between the yellow index (Y.I) after aging and the yellow index (Y.I) before aging, i.e., a value in percentage (%) of the yellow index (Y.I) after aging—the yellow index (Y.I) before aging over the yellow index (Y.I) before aging of within 25%, within 20%, within 15%, within 10%, within 8%, within 5%, or within 4%, and discoloration during aging evaluation can be minimized.

Specifically, the physical properties measured after preparing a specimen by injection molding using the polyethylene are expressed as the measured values before aging evaluation (day 0), and the physical properties measured after storage in an air convection oven at 80° C. for 10 days are expressed as the measured values after aging evaluation (day 10). The absolute value of the difference in yellow index before and after aging may be 0.8 or less, or 0 to 0.8, and preferably 0.5 or less, 0.3 or less, or 0.25 or less. For example, when the yellow index before aging evaluation (day 0) is −8, the measured value after aging evaluation (day 10) may be −8.8 to −8.

Meanwhile, in order to confirm the degree of decrease in tensile strength of the polyethylene after a certain period of time, the tensile strength (MPa) may be measured according to ASTM D 638. For example, it can be measured according to the method specified in ASTM D 638 using a specimen having a thickness of 6.4 mm at room temperature (23° C.) under the condition of a tensile rate of 50 mm/min.

The polyethylene according to one embodiment of the present disclosure may have a ratio (%) of the difference between the tensile strength (MPa) after aging and the tensile strength (MPa) before aging, i.e., a value in percentage (%) of the tensile strength (MPa) after aging—the tensile strength (MPa) before aging over the tensile strength (MPa) before aging of within 18%, within 15%, within 13%, within 11%, within 10%, or within 9.6%, and deterioration in tensile strength during aging evaluation can be minimized.

Specifically, the physical properties measured after preparing a specimen by injection molding using the polyethylene are expressed as the measured values before aging evaluation (day 0), and the physical properties measured after storage in an air convection oven at 80° C. for 10 days are expressed as the measured values after aging evaluation (day 10). The absolute value of the difference in tensile strength for confirming the degree of decrease in tensile strength before and after aging may be 5 MPa or less, or 0 to 5 MPa, and preferably 4.5 MPa or less, 4.0 MPa or less, or 3.5 MPa or less. For example, when the tensile strength before aging evaluation (day 0) is 30 MPa, the measured value after aging evaluation (day 10) may be 25 MPa to 30 MPa.

For example, the tensile strength before aging (day 0) measured as described above may be 25 MPa or more, or 25 MPa to 50 MPa, and preferably 26 MPa or more, 27 MPa or more, or 28 MPa or more. In addition, the tensile strength after aging (day 10) measured as described above may be 20 MPa or more, or 20 MPa to 50 MPa, and preferably 22 MPa or more, 24 MPa or more, or 25 MPa or more.

In addition, the polyethylene has improved aging lifetime as described above, and can improve the yellow index in the manufacture of bi-component fibers and significantly enhance filterability in the spinning process. Specifically, the polyethylene may have a die pressure increasing rate (bar/hr), i.e., filterability, of about 3.7 bar/hr or less, or about 0 to about 3.7 bar/hr. Herein, the filterability is a die pressure increment (ΔP) over extrusion test time period (Δt) measured in the filterability test by performing an extruder die pressure increasing rate test (e.g., 4 hrs, #500, 25 kg/hr) under the condition of about 20 to 30 kg/hr. Preferably, the polyethylene may have the filterability, i.e., a die pressure increasing rate per unit time (bar/hr), measured by the extruder die pressure increasing rate test (4 hrs, #500, 25 kg/hr) of about 3.5 bar/hr or less, about 3.4 bar/hr or less, about 3.2 bar/hr or less, or about 3.1 bar/hr or less, and about 0.5 bar/hr or more, about 1 bar/hr or more, about 2 bar/hr or more, or about 2.5 bar/hr or more.

Meanwhile, according to another embodiment of the present disclosure, there is provided a method for preparing the above-described polyethylene.

Specifically, the polyethylene is prepared by a method including the step of polymerizing one or more olefinic monomers in the presence of a hybrid supported metallocene catalyst, wherein the hybrid supported metallocene catalyst includes a first cocatalyst supported on a support, at least one first metallocene compound represented by the following Chemical Formula 1, at least one second metallocene compound represented by the following Chemical Formula 2, and a second cocatalyst, and is prepared by a method including the step of supporting a first metallocene compound of the following Chemical Formula 1 and a second metallocene compound of the following Chemical Formula 2, respectively, before and after the step of supporting a first cocatalyst on a support; and the step of supporting a second cocatalyst on the support:

[Chemical Formula 1]

$$(Cp^1R^a)_n(Cp^2R^b)M^1Z^1_{3-n}$$

in Chemical Formula 1, $M^1$ is a Group 4 transition metal;

$Cp^1$ and $Cp^2$ are the same as or different from each other, and each independently any one selected from the group consisting of cyclopentadienyl, indenyl, 4,5,6,7-tetrahydro-1-indenyl, and fluorenyl radical, wherein they may be substituted with $C_{1-20}$ hydrocarbon;

$R^a$ and $R^b$ are the same as or different from each other, and each independently hydrogen, substituted or unsubstituted $C_{1-20}$ alkyl, substituted or unsubstituted $C_{1-10}$ alkoxy, substituted or unsubstituted $C_{2-20}$ alkoxyalkyl, substituted or unsubstituted $C_{6-20}$ aryl, substituted or unsubstituted $C_{6-10}$ aryloxy, substituted or unsubstituted $C_{2-20}$ alkenyl, substituted or unsubstituted $C_{7-40}$ alkylaryl, substituted or unsubstituted $C_{7-40}$ arylalkyl, substituted or unsubstituted $C_{8-40}$ arylalkenyl, or substituted or unsubstituted $C_{2-10}$ alkynyl;

$Z^1$ are each independently a halogen atom, substituted or unsubstituted $C_{1-20}$ alkyl, substituted or unsubstituted $C_{2-10}$ alkenyl, substituted or unsubstituted $C_{7-40}$ alkylaryl, substituted or unsubstituted $C_{7-40}$ arylalkyl, substituted or unsubstituted $C_{6-20}$ aryl, substituted or unsubstituted $C_{1-20}$ alkylidene, substituted or unsubstituted amino, substituted or unsubstituted $C_{2-20}$ alkylalkoxy, or substituted or unsubstituted $C_{7-40}$ arylalkoxy; and n is 1 or 0;

[Chemical Formula 2]

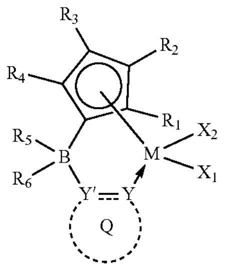

in Chemical Formula 2,

B is boron,

M is a group 4 transition metal, $R_1$ to $R_4$ are each independently hydrogen, substituted or unsubstituted $C_{1-20}$ alkyl, substituted or unsubstituted $C_{3-20}$ cycloalkyl, or substituted or unsubstituted $C_{6-20}$ aryl, or $R_1$ and $R_2$ or $R_3$ and $R_4$ are bonded to each other to form a substituted or unsubstituted $C_{6-60}$ aromatic ring, $R_5$ and $R_6$ are each independently substituted or unsubstituted $C_{1-20}$ alkyl, substituted or unsubstituted $C_{3-20}$ cycloalkyl, or substituted or unsubstituted $C_{6-20}$ aryl, or $R_5$ and $R_6$ are bonded to each other to form a substituted or unsubstituted $C_{3-60}$ aliphatic ring or a substituted or unsubstituted $C_{6-60}$ aromatic ring, $X_1$ and $X_2$ are each independently substituted or unsubstituted $C_{1-20}$ alkyl or —O(CO)R', wherein R' is $C_{1-20}$ alkyl, Q is a substituted or unsubstituted $C_{2-60}$ heterocyclic ring containing at least one selected from the group consisting of N, O and S, Y and Y' are elements constituting Q, Y is N, O, or S, Y' is an element of Q and adjacent to Y, and Y' is N or C.

The substituents are described in more detail as follows.

Unless otherwise specified herein, following terms may be defined as follows.

The halogen may be fluorine (F), chlorine (Cl), bromine (Br) or iodine (I).

Meanwhile, the alkyl may be linear or branched alkyl. Specifically, the $C_{1-20}$ alkyl may be $C_{1-20}$ linear alkyl; $C_{1-10}$ linear alkyl; $C_{1-5}$ linear alkyl; $C_{3-20}$ branched alkyl; $C_{3-15}$ branched alkyl; or $C_{3-10}$ branched alkyl. More specifically, $C_{1-20}$ alkyl may be a methyl group, an ethyl group, an n-propyl group, an iso-propyl group, an n-butyl group, an iso-butyl group, a tert-butyl group, an n-pentyl group, or an iso-pentyl group, but the present disclosure is not limited thereto. Meanwhile, as used herein, "iPr" refers to an iso-propyl group.

The cycloalkyl may be cyclic alkyl. Specifically, the $C_{3-20}$ cycloalkyl may be $C_{3-20}$ cyclic alkyl; $C_{3-15}$ cyclic alkyl; or $C_{3-10}$ cyclic alkyl. More specifically, it may be cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, or the like, but the present disclosure is not limited thereto. Meanwhile, as used herein, "Cy" refers to C3 to C6 cycloalkyl.

Meanwhile, the alkenyl may be linear, branched, or cyclic alkenyl. Specifically, the $C_{2-20}$ alkenyl may be $C_{2-20}$ linear alkenyl, $C_{2-10}$ linear alkenyl, $C_{2-5}$ linear alkenyl, $C_{3-20}$ branched alkenyl, $C_{3-15}$ branched alkenyl, $C_{3-10}$ branched alkenyl, $C_{5-20}$ cyclic alkenyl or $C_{5-10}$ cyclic alkenyl. More specifically, the $C_{2-20}$ alkenyl may be ethenyl, propenyl, butenyl, pentenyl, cyclohexenyl, or the like.

The alkoxy may be a linear, branched, or cyclic alkoxy group. Specifically, the $C_{1-20}$ alkoxy may be a $C_{1-20}$ linear alkoxy group; a $C_{1-10}$ linear alkoxy group; a $C_{1-5}$ linear alkoxy group; a $C_{3-20}$ branched or cyclic alkoxy group; a $C_{3-15}$ branched or cyclic alkoxy group; or a $C_{3-10}$ branched or cyclic alkoxy group. More specifically, the $C_{1-20}$ alkoxy may be methoxy, ethoxy, n-propoxy, iso-propoxy, n-butoxy, iso-butoxy, tert-butoxy, n-pentoxy, iso-pentoxy, neo-pentoxy, or cyclohexyloxy, but the present disclosure is not limited thereto.

The alkoxyalkyl may have a structure including —$R_a$—O—$R_b$, and may be a substituent in which one or more hydrogens of alkyl (—$R_a$) are substituted with alkoxy (—O—$R_b$). Specifically, the $C_{2-20}$ alkoxyalkyl may be methoxymethyl, methoxyethyl, ethoxymethyl, iso-propoxymethyl, iso-propoxyethyl, iso-propoxyhexyl, tert-butoxymethyl, tert-butoxyethyl, tert-butoxyhexyl, or the like.

The aryl may be a monocyclic, bicyclic or tricyclic aromatic hydrocarbon. According to an embodiment of the present disclosure, the aryl may have 6 to 60 carbon atoms, or 6 to 20 carbon atoms. Specifically, the aryl may be phenyl, naphthyl, anthracenyl, dimethylanilinyl, anisolyl, or the like, but is not limited thereto.

The heteroaryl is heteroaryl containing at least one of O, N, and S as a heterogeneous element, and may have 2 to 60 carbon atoms, or 2 to 20 carbon atoms, although the number of carbon atoms is not particularly limited. Specifically, it may be xanthene, thioxanthen, a thiophene group, a furan group, a pyrrole group, an imidazole group, a thiazole group, an oxazole group, an oxadiazole group, a triazole group, a pyridyl group, a bipyridyl group, a pyridinyl group, a pyrimidyl group, a triazine group, an acridyl group, a pyridazine group, a pyrazinyl group, a quinolinyl group, a quinazoline group, a quinoxalinyl group, a phthalazinyl group, a pyrido-pyrimidinyl group, a pyrido-pyrazinyl group, a pyrazino-pyrazinyl group, an isoquinoline group, an indole group, a carbazole group, a benzoxazole group, a benzoimidazole group, a benzothiazole group, a benzocarbazole group, a benzothiophene group, a dibenzothiophene group, a benzofuranyl group, a phenanthroline group, an isoxazolyl group, a thiadiazolyl group, a phenothiazinyl group, a dibenzofuranyl group, or the like, but the present disclosure is not limited thereto.

The hydrocarbyl group is a monovalent hydrocarbon compound, and may include an alkyl group, an alkenyl group, an alkynyl group, an aryl group, an aralkyl group, an aralkenyl group, an aralkynyl group, an alkylaryl group, an alkenylaryl group, an alkynylaryl group, and the like. For example, the hydrocarbyl group may be a linear, branched or cyclic alkyl. More specifically, the C1 to C30 hydrocarbyl group may be a linear, branched or cyclic alkyl group such as a methyl group, an ethyl group, an n-propyl group, an iso-propyl group, an n-butyl group, an iso-butyl group, a tert-butyl group, an n-pentyl group, an n-hexyl group, an n-heptyl group and a cyclohexyl group; or an aryl group such as phenyl, biphenyl, naphthyl, anthracenyl, phenanthrenyl, or fluorenyl. Moreover, it may be alkylaryl such as methylphenyl, ethylphenyl, methylbiphenyl, and methylnaphthyl, or arylalkyl such as phenylmethyl, phenylethyl, biphenylmethyl, and naphthylmethyl. It may also be alkenyl such as allyl, ethenyl, propenyl, butenyl, and pentenyl.

In addition, the heterocyclic ring includes both an aliphatic ring containing at least one selected from the group consisting of N, O and S and an aromatic ring containing at least one selected from the group consisting of N, O and S.

In addition, the Group 4 transition metal may be titanium (Ti), zirconium (Zr), hafnium (Hf), or rutherpodium (Rf), and specifically titanium (Ti), zirconium (Zr), or hafnium (Hf). More specifically, it may be zirconium (Zr) or hafnium (Hf), but is not limited thereto.

The above-mentioned substituents may be optionally substituted with one or more substituents selected from the group consisting of a hydroxyl group; halogen; alkyl or alkenyl, aryl, alkoxy; alkyl or alkenyl, aryl, alkoxy containing at least one heteroatom of Group 14 to 16 heteroatoms; amino; silyl; alkylsilyl or alkoxysilyl; a phosphine group; a phosphide group; a sulfonate group; and a sulfone group within the range of exhibiting the same or similar effects as the desired effects.

The metallocene catalyst for ethylene polymerization of the present disclosure may include at least one first metallocene compound represented by the Chemical Formula 1 and at least one second metallocene compound represented by the Chemical Formula 2 as a catalyst precursor.

When the first metallocene compound represented by the Chemical Formula 1 is activated by an appropriate method and used as a catalyst for olefin polymerization, a polyethylene having a low molecular weight can be provided. Therefore, the hybrid supported catalyst including the first and second metallocene compounds may provide a polyethylene having a broad molecular weight distribution.

Specifically, $Cp^1$ and $Cp^2$ of Chemical Formula 1 may be cyclopentadienyl groups. The first metallocene compound in which $Cp^1$ and $Cp^2$ are cyclopentadienyl groups and the cyclopentadiethyl group is not bridged shows low comonomer incorporation with alpha-olefins in the olefin polymerization, and predominantly produces a polyethylene having a low molecular weight. Therefore, when the first metallocene compound is mixed with the second metallocene compound of Chemical Formula 2 and supported on the same support, the molecular weight distribution of the polyethylene, the distribution of the copolymerized monomer in the polyethylene chain and the copolymerization characteristics of the olefin can be easily controlled, so that the desired physical properties of the polyethylene of the present disclosure can be more easily achieved.

$Cp^1$ may be substituted by one to five $R^a$, and $Cp^2$ may be substituted by one to five $R^b$. When two or more $R^a$ are substituted in the Chemical Formula 1, a plurality of $R^a$ may be the same as or different from each other. In addition, when two or more $R^b$ are substituted in the Chemical Formula 1, a plurality of $R^b$ may also be the same as or different from each other.

$R^a$ and $R^b$ may each independently be any one of hydrogen, a $C_{1-10}$ hydrocarbyl group, a $C_{1-10}$ hydrocarbyloxy group, and a $C_{2-20}$ hydrocarbyloxyhydrocarbyl group. Specifically, $R^a$ and $R^b$ may each independently be hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl. More specifically, they may each independently be hydrogen, $C_{1-6}$ alkyl, $C_{7-12}$ arylalkyl, $C_{2-12}$ alkoxyalkyl, $C_{6-12}$ aryl, or $C_{2-6}$ alkenyl. Preferably, $R^a$ and $R^b$ may each independently be hydrogen, methyl, ethyl, propyl, isopropyl, n-butyl, tert-butyl, pentyl, hexyl, butenyl, phenyl, phenyl-substituted methyl, phenyl-substituted butyl, or tert-butoxy hexyl. The first metallocene compound in which $R^a$ and $R^b$ have the same substituents may have excellent supporting stability.

In addition, $Z^1$ of Chemical Formula 1 may each independently be any one of halogen. In the first metallocene compound in which $Z^1$ has a substituent as described above, the halogen group may be easily substituted with an alkyl group by a reaction with alkyl metal or methylaluminoxane, which is a cocatalyst. In addition, the first metallocene compound forms an ionic intermediate with the cocatalyst by subsequent alkyl abstraction, thereby more easily providing a cationic form, which is an active species of olefin polymerization.

Preferably, $M^1$ may be zirconium (Zr).

For example, in Chemical Formula 1, $M^1$ may be zirconium (Zr) or hafnium (Hf), and preferably zirconium (Zr). Further, each of $Cp^1$ and $Cp^2$ may be cyclopentadienyl, indenyl, or fluorenyl. In addition, each of $R^a$ and $R^b$ may be hydrogen, $C_{1-6}$ alkyl, $C_{7-12}$ arylalkyl, $C_{2-12}$ alkoxyalkyl, $C_{6-12}$ aryl, or $C_{2-6}$ alkenyl, and preferably be hydrogen, methyl, ethyl, propyl, isopropyl, n-butyl, tert-butyl, pentyl, hexyl, butenyl, phenyl, phenyl-substituted methyl, phenyl-substituted butyl, or tert-butoxyhexyl. In addition, each $Z^1$ may be a halogen atom, and preferably be chlorine (Cl). In addition, n may be 1.

The compound represented by the Chemical Formula 1 may be, for example, a compound represented by one of the following structural formulae, but is not limited thereto.

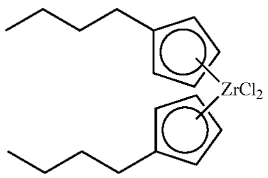

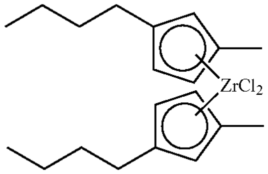

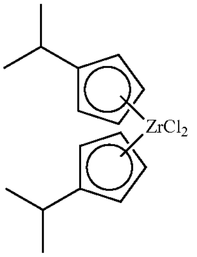

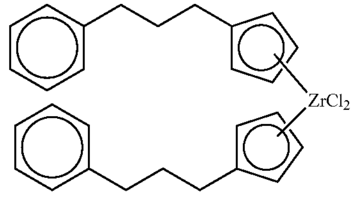

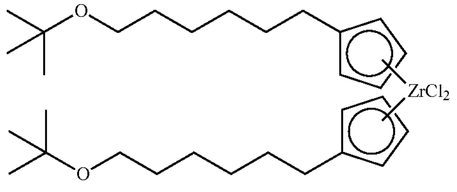

-continued

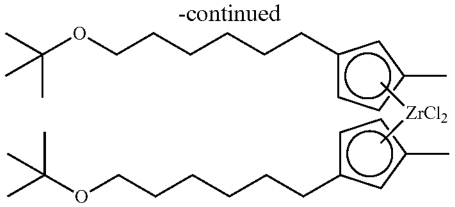

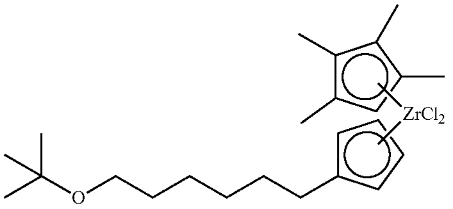

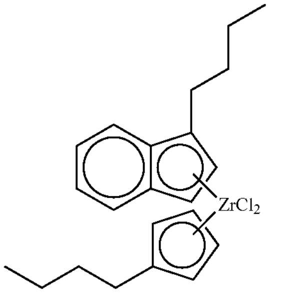

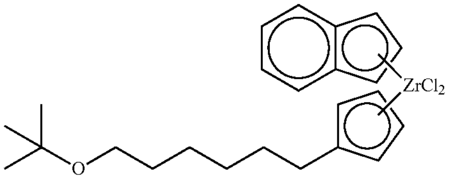

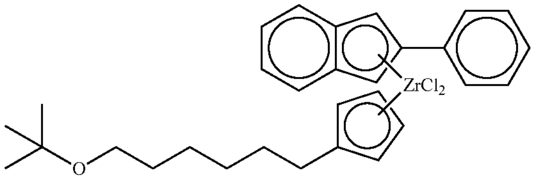

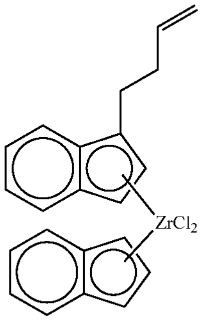

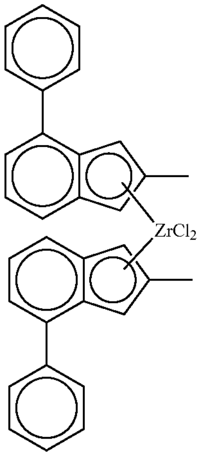

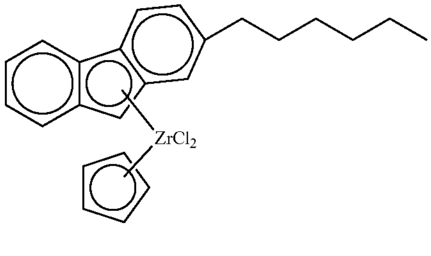

-continued

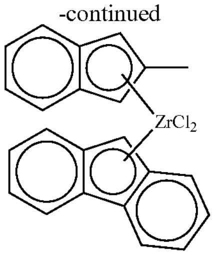

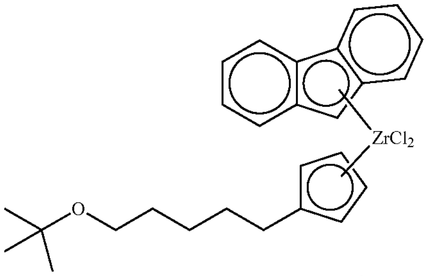

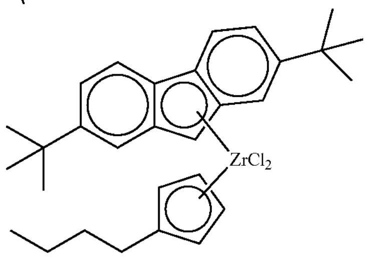

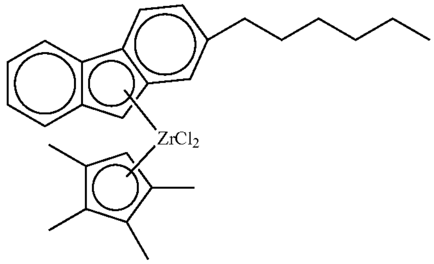

The first metallocene compound represented by the Chemical Formula 1 may be synthesized by applying known reactions, and a more detailed synthesis method may be understood with reference to Examples.

Specifically, the hybrid supported catalyst may include a first metallocene compound in which $Cp^1$ and $Cp^2$ are cyclopentadienyl groups, $R^a$ and $R^b$ are t-butoxyhexyl, $M^1$ is zirconium, $Z^1$ is chlorine (Cl), and n is 1.

Meanwhile, the polyethylene according to the present disclosure may be prepared by polymerizing ethylene in the presence of a catalyst containing at least one second metallocene compound represented by the following Chemical Formula 2 together with at least one first metallocene compound as a catalyst precursor.

The metallocene compound represented by the Chemical Formula 2 employs a bridge structure including a boron anion, unlike the conventionally used CGC (constrained geometry catalyst) type precursor. The conventional CGC type precursor has a neutral bridge structure including silicon, so that the ligand unit is negatively charged. This leads to a structural limitation, and there is a problem in that it is difficult to achieve various physical properties when preparing an olefin polymer.

On the other hand, the metallocene compound represented by the Chemical Formula 2 according to the present disclosure may have a neutral ligand unit, because the bridge structure is negatively charged. The ligand unit of the present disclosure is a heterocyclic ring Q of Chemical Formula 2, wherein Y, which is an element of Q, is coordinated with a metal, and Y', which is an element of Q and adjacent to Y, is connected to a bridge. Accordingly, as the present disclosure employs various neutral ligand units satisfying the above structure, a catalyst having higher activity and higher comonomer incorporation than the conventional CGC precursor can be prepared.

In addition, alkyl or carboxylate is included as a metal substituent of the metallocene compound represented by the Chemical Formula 2, which acts as a good leaving group to promote a reaction with a cocatalyst such as MAO, thereby increasing activity.

Specifically, in Chemical Formula 2, B is boron.

Specifically, in Chemical Formula 2, M may be zirconium (Zr).

In addition, in Chemical Formula 2, $R_1$ to $R_4$ may each independently be hydrogen, substituted or unsubstituted $C_{1-10}$ alkyl, or substituted or unsubstituted $C_{6-20}$ aryl; or $R_1$ and $R_2$ or $R_3$ and $R_4$ may be bonded to each other to form a substituted or unsubstituted $C_{6-20}$ aromatic ring. Preferably, $R_1$ to $R_4$ may each independently be hydrogen or methyl; or $R_1$ and $R_2$ or $R_3$ and $R_4$ may be bonded to each other to form a benzene ring or a 1,2,3,4-tetrahydronaphthalene ring, wherein the benzene ring or the 1,2,3,4-tetrahydronaphthalene ring is unsubstituted or substituted with one to four substituents selected from the group consisting of methyl, tertbutyl and 4-tertbutyl phenyl.

More preferably, all of $R_1$ to $R_4$ may be methyl.

In addition, in Chemical Formula 2, $R_5$ and $R_6$ may each independently be substituted or unsubstituted $C_{1-10}$ alkyl, or substituted or unsubstituted $C_{6-20}$ aryl; or $R_5$ and $R_6$ may be bonded to each other to form a substituted or unsubstituted $C_{3-20}$ aliphatic ring or a substituted or unsubstituted $C_{6-20}$ aromatic ring. Preferably, $R_5$ and $R_6$ may each independently be methyl or phenyl, or $R_5$ and $R_6$ may be bonded to each other to form a cyclooctane ring.

More preferably, both $R_5$ and $R_6$ may be phenyl.

In addition, in Chemical Formula 2, $X_1$ and $X_2$ may each independently be substituted or unsubstituted $C_{1-10}$ alkyl or —O(CO)R', wherein R' is $C_{1-10}$ alkyl. Preferably, $X_1$ and $X_2$ may each independently be methyl or acetate.

In addition, in Chemical Formula 2, R' may be methyl.

In addition, in Chemical Formula 2, $X_1$ and $X_2$ may be the same.

More preferably, $X_1$ and $X_2$ may be methyl.

In addition, in Chemical Formula 2, Q may be a substituted or unsubstituted $C_{2-20}$ or $C_{2-12}$ heterocyclic ring containing at least one selected from the group consisting of N, O and S. Preferably, Q may be a pyridine ring, a quinoline ring, a 4,5-dihydrooxazole ring, a pyrazole ring, or a benzoxazole ring, wherein Q is unsubstituted or substituted with one to four substituents selected from the group consisting of methyl, isopropyl and diphenylamino. More preferably, Q may be a pyridine ring, a 4,5-dihydrooxazole ring, a pyrazole ring, or a benzoxazole ring, wherein Q is unsubstituted or substituted with one to four substituents selected from the group consisting of methyl, isopropyl and diphenylamino.

In addition, in Chemical Formula 2, Y is a hetero atom coordinated with the metal M. Preferably, Y may be N.

More preferably, in Chemical Formula 2, Q including Y and Y' may be a pyridine ring.

Meanwhile, specific examples of the second metallocene compound represented by the Chemical Formula 2 may include compounds represented by the following structural formulae, but the present disclosure is not limited thereto:

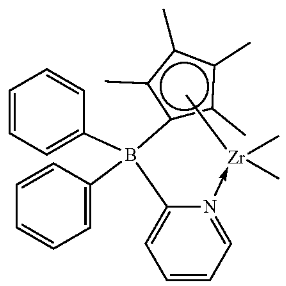

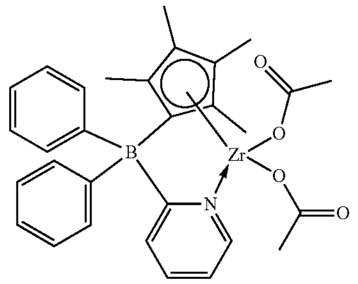

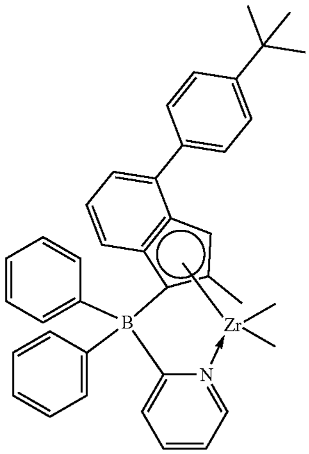

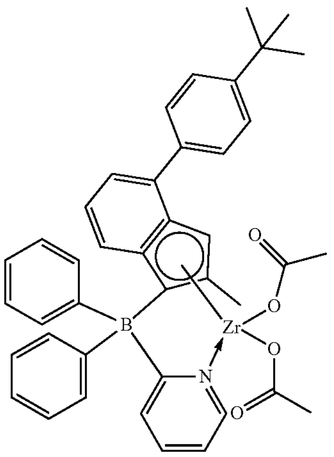

-continued
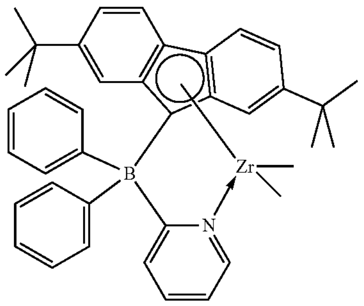
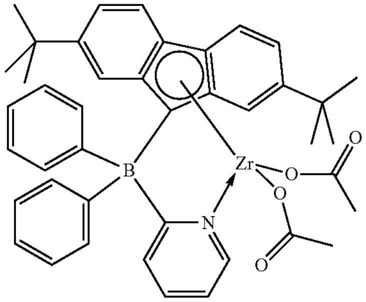
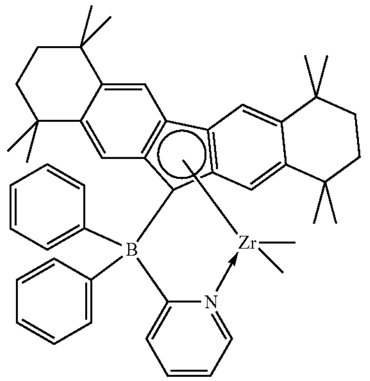
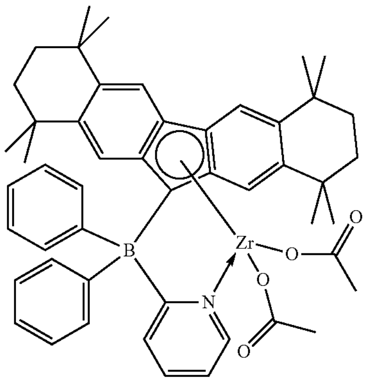
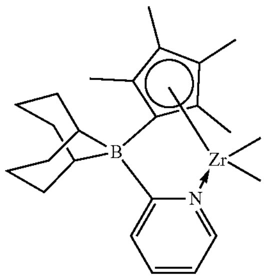
-continued
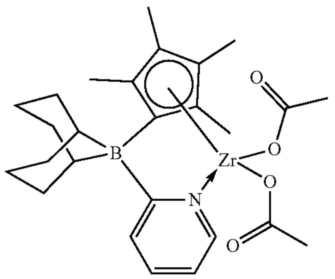
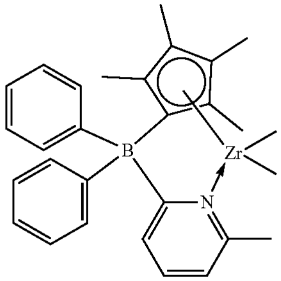
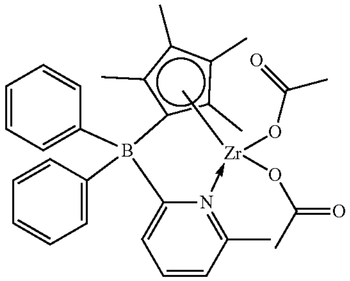
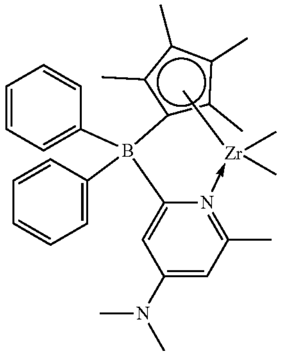
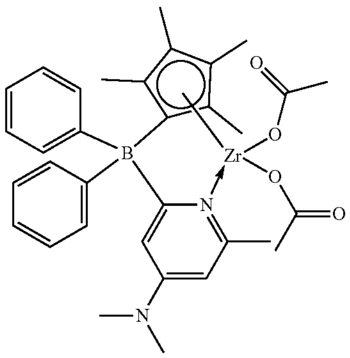

-continued
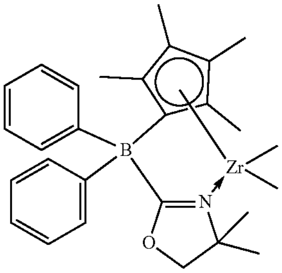
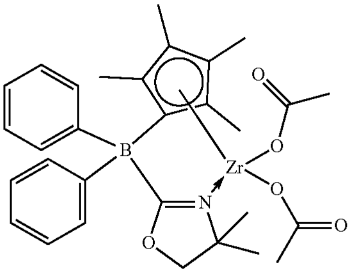
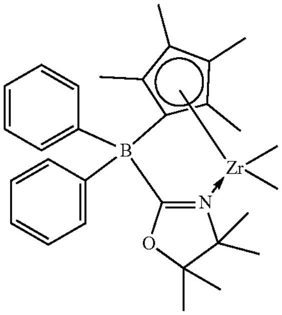
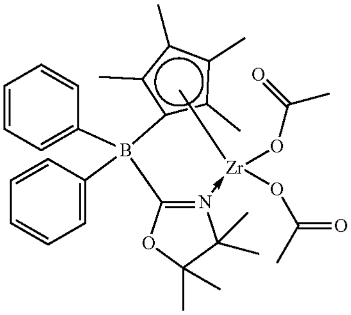
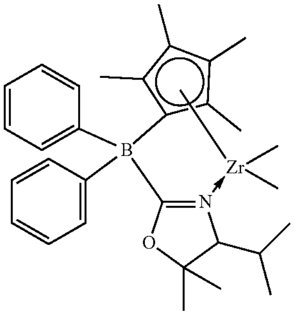
-continued
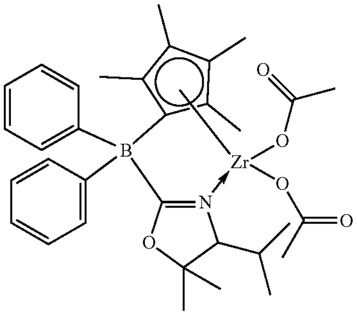
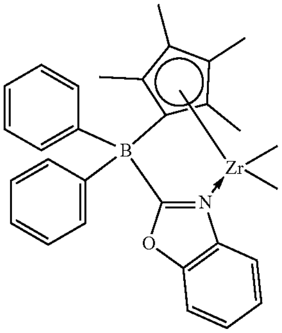
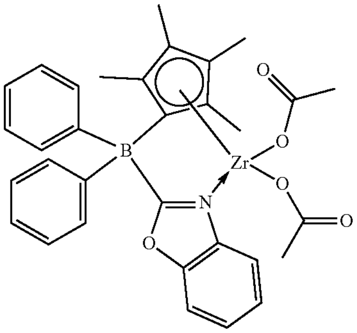
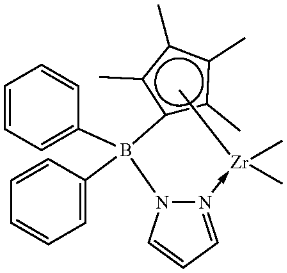
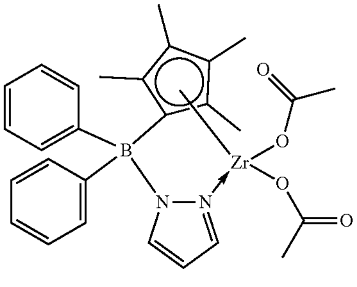

-continued

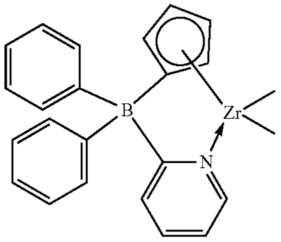

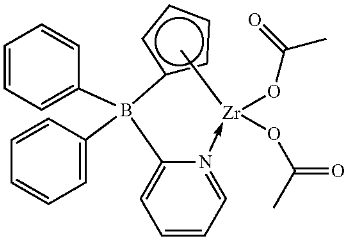

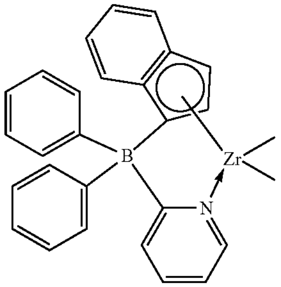

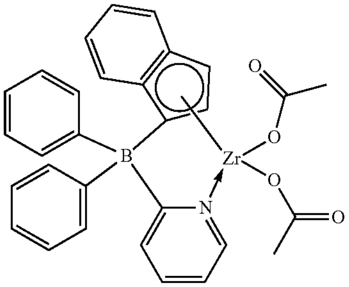

When $X_1$ and $X_2$ are the same as each other, the second metallocene compound represented by the Chemical Formula 2 may be prepared by, for example, a preparation method as shown in Reaction Scheme 1 below. However, the present disclosure is not limited thereto, and it may be prepared according to known methods for preparing organic compounds and metallocene compounds. A more detailed method is described in Preparation Examples to be described later.

[Reaction Scheme 1]

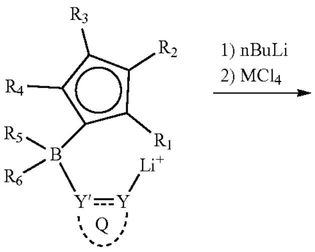

-continued

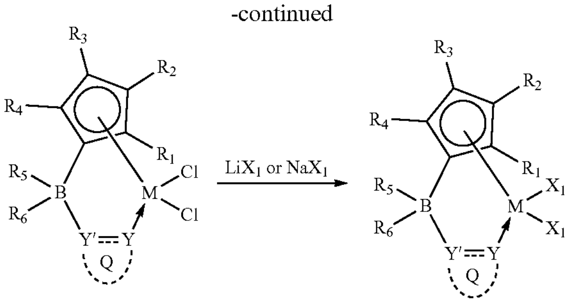

In Reaction Scheme 1, B, M, $R_1$ to $R_6$, $X_1$, $X_2$, Q, Y and Y' are as defined in Chemical Formula 2 above.

Specifically, the supported hybrid catalyst may include a second metallocene compound in which B is boron, M is zirconium, $R_1$ to $R_4$ are methyl, $R_5$ and $R_6$ are phenyl, $X_1$ and $X_2$ are methyl, Y is N, Y' is C, and Q including Y and Y' is a pyridine ring.

Meanwhile, the first and second metallocene compounds may be combined in an appropriate amount according to the physical properties of the polyethylene to be prepared. For example, in order to provide a polyethylene having a broad molecular weight distribution and a high molecular weight, the first and second metallocene compounds may be used in a molar ratio of 3:1 to 1:10 (first metallocene compound: second metallocene compound). Specifically, the molar ratio of the first and second metallocene compounds may be 2.5:1 to 1:5, 2:1 to 1:4, 2:1 to 1:2, or 2:1 to 1:1. Accordingly, desired physical properties can be more easily achieved by easily controlling the molecular weight distribution of polyethylene, the distribution of the copolymerized monomer in the polyethylene chain and the copolymerization characteristics of ethylene.

In particular, the metallocene catalyst of the present disclosure is a hybrid supported catalyst in which at least one first metallocene compound represented by the Chemical Formula 1 and at least one second metallocene compound represented by the Chemical Formula 2 are supported. When a supported metallocene catalyst is used, morphology and physical properties of the polyethylene to be prepared are excellent, and it may be suitably used in the conventional slurry polymerization, bulk polymerization, or gas phase polymerization process.

In the hybrid supported metallocene catalyst of the present disclosure, the support for supporting the first metallocene compound and the second metallocene compound may have a hydroxyl group, a silanol group, or a siloxane group having high reactivity on its surface. The support may be surface-modified by calcination, or may be dried to remove moisture from the surface. For example, the support may be silica prepared by calcining silica gel, silica dried at a high temperature, silica-alumina, or silica-magnesia, and it may usually contain oxides, carbonates, sulfates, or nitrates such as $Na_2O$, $K_2CO_3$, $BaSO_4$, $Mg(NO_3)_2$ and the like.

The support is preferably used in a sufficiently dried state before the first and second cocatalysts are supported. The support is preferably calcined or dried at about 200 to 600° C., and more preferably at about 250 to 600° C. When the temperature is low, the support contains too much moisture, so that the moisture on the surface may react with the cocatalyst. In addition, a cocatalyst supporting ratio may be relatively high due to excess hydroxyl groups, but this requires a large amount of cocatalyst. When the temperature is excessively high, pores on the surface of the support may be combined with each other to reduce surface area, and many hydroxyl groups or silanol groups may be lost from the surface, leaving only siloxane groups. Thus, reactive sites with cocatalyst may be reduced, which is not preferable.

The amount of hydroxyl groups on the surface may preferably be 0.1 to 10 mmol/g, or 0.5 to 5 mmol/g. The amount of hydroxyl groups on the surface may be controlled by the preparation method, the preparation conditions, or the drying conditions such as temperature, time, vacuum or spray drying of the support.

When the amount of hydroxyl groups is less than 0.1 mmol/g, reactive sites with cocatalyst may be insufficient. When the amount of hydroxyl groups is more than 10 mmol/g, it may be caused by moisture besides the hydroxyl groups present on the surface of support particles, which is not desirable.

For example, the amount of hydroxyl groups on the surface may be 0.1 to 10 mmol/g, or 0.5 to 5 mmol/g. The amount of hydroxyl groups may be controlled by the preparation method, the preparation conditions, or the drying conditions such as temperature, time, vacuum or spray drying of the support. When the amount of hydroxyl groups is excessively low, reactive sites with cocatalyst may be insufficient. When the amount of hydroxyl groups is excessively high, it may be caused by moisture besides the hydroxyl groups present on the surface of support particles, which is not desirable.

Among the above-mentioned supports, the silica prepared by calcining silica, particularly silica gel, has little catalyst released from the surface of the support in the polymerization process of the propylene, because the silica support and the functional group of the compound of Chemical Formula 1 are supported by chemical bonding. As a result, when the polyethylene is prepared by slurry polymerization or gas phase polymerization, a fouling phenomenon, sticking to the wall surface of the reactor or with each other, may be minimized.

In addition, when supported on a support, a total amount of the first metallocene compound of Chemical Formula 1 and the second metallocene compound of Chemical Formula 2 may be about 10 μmol or more, about 20 μmol or more, about 30 μmol or more, or about 50 μmol or more, and about 250 μmol or less, about 200 μmol or less, about 180 μmol or less, or about 150 μmol or less based on a weight of the support, for example, 1 g of silica. When supported within the above range, the supported catalyst may exhibit appropriate activity, which is advantageous in terms of maintaining catalytic activity and economic feasibility.

Meanwhile, the hybrid metallocene catalyst of the present disclosure may include a first cocatalyst and a second cocatalyst for making catalytically active species. The catalytic activity can be improved by using the two types of cocatalysts, and in particular, the molecular weight distribution of polyethylene can be controlled by using the second cocatalyst.

The first cocatalyst may be any cocatalyst used for polymerizing olefins in the presence of a general metallocene catalyst. This first cocatalyst causes a bond to be formed between the hydroxyl group on the support and the transition metal. In addition, since the first cocatalyst is present only on the surface of the support, it can contribute to securing intrinsic properties of the specific hybrid catalyst composition of the present disclosure without a fouling phenomenon, sticking to the wall surface of the reactor or with each other.

In the hybrid supported metallocene catalyst, the first cocatalyst may be at least one selected from compounds represented by the following Chemical Formulae 3 and 4:

[Chemical Formula 3]

$$—[Al(R_{31})—O]_m—$$

in Chemical Formula 3, $R_{31}$ are the same as or different from each other, and each independently halogen; or $C_{1-20}$ hydrocarbyl substituted or unsubstituted with halogen; and m is an integer of 2 or more,

[Chemical Formula 4]

$$D(R_{41})_3$$

in Chemical Formula 4,

D is aluminum or boron, and $R_{41}$ are the same as or different from each other, and each independently halogen; or $C_{1-20}$ hydrocarbyl substituted or unsubstituted with halogen.

The compound represented by the Chemical Formula 3 may be methylaluminoxane, ethylaluminoxane, isobutylaluminoxane, butylaluminoxane, and the like. Preferably, it may be methylaluminoxane.

The compound represented by the Chemical Formula 4 may be trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and the like. Preferably, it may be selected from trimethylaluminum, triethylaluminum, and triisobutylaluminum.

Meanwhile, in the present disclosure, the second cocatalyst included in the hybrid supported metallocene catalyst may be a borate compound represented by the following Chemical Formula 5 or Chemical Formula 6:

[Chemical Formula 5]

$$[L-H]^+[ZA_4]^-$$

[Chemical Formula 6]

$$[L]^+[ZA_4]^-$$

in Chemical Formulae 5 and 6,

L are each independently a neutral or cationic Lewis base;

H is a hydrogen atom;

Z are each independently boron; and

A are the same as or different from each other, and each independently $C_{6-20}$ aryl or $C_{1-20}$ alkyl, wherein the $C_{6-20}$ aryl or $C_{1-20}$ alkyl is unsubstituted or substituted with at least one substituent selected from the group consisting of halogen, $C_{1-20}$ alkyl, $C_{1-20}$ alkoxy and $C_{6-20}$ aryloxy.

In addition, in Chemical Formula 5, $[L-H]^+$ is a Bronsted acid.

Specifically, the borate-based second cocatalyst may include trimethylammonium tetrakis(pentafluorophenyl)borate, triethylammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-(triisopropylsilyl)-2,3,5,6-tetrafluorophenyl)borate, N,N-dimethylanilinium pentafluorophenoxytris (pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, N,N-dimethylanilinium tetrakis(2,3,4,6-tetra fluorophenyl)borate, hexadecyldimethylammonium tetrakis (pentafluorophenyl)borate, N-methyl-N-dodecylanilinium tetrakis(pentafluorophenyl)borate, or methyldi(dodecyl)ammonium tetrakis(pentafluorophenyl)borate. Preferably, the borate-based second cocatalyst may include trityltetrakis (pentafluorophenyl)borate, N,N-dimethylaniliniumtetrakis (pentafluorophenyl)borate, trimethylammonium tetrakis (pentafluorophenyl)borate, triethylammonium tetrakis (pentafluorophenyl)borate, or tripropylammonium tetrakis (pentafluorophenyl)borate, and more preferably N,N-dimethylaniliniumtetrakis(pentafluorophenyl)borate. As the cocatalyst of the present disclosure is used in the preparation of the polyethylene suitable for preparing fibers, it exhibits use specificity and manufacturing method specificity.

In the preparation of the hybrid supported metallocene catalyst of the present disclosure, the supporting order of each component preferably includes the step of supporting a first metallocene compound of the following Chemical Formula 1 and a second metallocene compound of the following Chemical Formula 2, respectively, before and after the step of supporting a first cocatalyst on a support; and the step of supporting a second cocatalyst on the support. According to this method, the hybrid supported metallocene catalyst of the present disclosure may include a first cocatalyst, first and second metallocene compounds of the following Chemical Formulae 1 and 2 supported on a support; and a second cocatalyst.

In addition, the supporting conditions are not particularly limited and the supporting step may be performed within a range well known to those skilled in the art. For example, the supporting step may be performed at a high temperature and at a low temperature appropriately. Specifically, when the first cocatalyst and the second cocatalyst are supported on the support, the supporting temperature may be in a range of about 25° C. to 100° C. The supporting time of the first cocatalyst and the second cocatalyst may be appropriately controlled depending on the amount of the cocatalyst to be supported. In addition, the reaction temperature of the first and second metallocene compounds with the support may be −30° C. to 150° C., preferably room temperature to 100° C., and more preferably 30° C. to 80° C. The reacted supported catalyst may be used as it is after removing the reaction solvent by filtration or distillation under reduced pressure, or subjected to soxhlet filtering using aromatic hydrocarbon such as toluene, if necessary.

In addition, in the hybrid supported metallocene catalyst, a total amount of the first cocatalyst and the second cocatalyst and a total amount of the first metallocene compound of Chemical Formula 1 and the second metallocene compound of Chemical Formula 2 may be in a molar ratio (sum of the first and second cocatalysts:sum of the first and second metallocene compounds) of about 1000:1 to about 1:1000, preferably about 100:1 to about 1:100, and more preferably about 60:1 to about 1:60. When the molar ratio of the metallocene compounds exceeds about 1000, the metal content of the cocatalyst is too small, so the catalytically active species is not well made, resulting in low activity. When the molar ratio of the cocatalysts exceeds about 1000, the metal of the cocatalyst may act as a catalyst poison.

The first and the second cocatalysts may be supported in a total amount of about 3 mmol to 25 mmol, about 5 mmol to 20 mmol, or about 6 mmol to 15 mmol based on 1 g of the support.

Particularly, in the hybrid supported metallocene catalyst, a molar ratio of the total metal contained in the metallocene catalyst including the first metallocene compound and the second metallocene compound to the boron contained in the borate-based second cocatalyst may be 1:0.45 or more, 1:0.8 or more, or 1:1 or more, and 1:3 or less, 1:2.8 or less, or 1:2.7 or less. When the molar ratio is less than 1:0.45, there is a problem in that the catalytic activity is lowered, and when it exceeds 1:3, the activity is excellent, but there is a problem in that polymerization reactivity is non-uniform, so that process operation is not easy.

The preparation of the supported catalyst may be performed in the presence of a solvent or without a solvent. When the solvent is used, it may include C5 to C12 aliphatic hydrocarbon solvents such as hexane or pentane, aromatic hydrocarbon solvents such as toluene or benzene, chlorinated hydrocarbon solvents such as dichloromethane, ether solvents such as diethylether or tetrahydrofuran (THF), and common organic solvents such as acetone or ethylacetate. It is preferable to use hexane, heptane, toluene, or dichloromethane. The solvent used herein is preferably used after removing a small amount of water or air, which acts as a catalyst poison, by treating with a small amount of alkyl aluminum. It is also possible to further use the cocatalyst.

For details on the preparation method of the hybrid supported catalyst, refer to Examples to be described later. However, the preparation method of the hybrid supported catalyst is not limited to this description. The preparation method may further include a step which is usually carried out in the technical field of the present invention, and the step(s) of the preparation method may be changed by the step(s) usually changeable.

The polyethylene according to one embodiment of the present disclosure may be provided by a method including the step of polymerizing olefinic monomers in the presence of a hybrid supported catalyst.

Examples of the olefinic monomer polymerizable by the hybrid supported catalyst include ethylene, alpha-olefin, and cyclic olefin, and a diene olefinic monomer or triene olefinic monomer having two or more double bonds may also be polymerized. Specific examples of the monomer include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, 3-chloromethylstyrene, etc., and may be copolymerized by mixing two or more of these monomers. When the polyethylene is a copolymer of ethylene and another comonomer, the comonomer is preferably at least one selected from the group consisting of propylene, 1-butene, 1-hexene, 4-methyl-1-pentene and 1-octene. Specifically, the comonomer may be 1-butene or 1-hexene, and preferably 1-butene.

Meanwhile, in the copolymerization step, the comonomer may be added in an amount such that the alpha-olefin-derived repeating unit is included in the polyethylene in an optimal amount, as described above. For example, the comonomer may be added in an amount such that the comonomer-derived repeating unit obtained through the copolymerization process is included in the polyethylene in an amount of about 5 mol % or less or about 0 to about 5 mol %. Specifically, the input amount of the comonomer may be adjusted in consideration of the range as described above in relation to the amount of the comonomer-derived repeating unit included in the polyethylene.

For example, the copolymerization step may be performed by reacting the comonomer in an amount of about 0.05 mol or less, or 0 to about 0.05 mol based on 1 mol of ethylene. When reacted within the above range, the polyethylene may exhibit better filterability. Preferably, about 0.048 mol or less, 0.045 mol or less, 0.042 mol or less, 0.04 mol or less, 0.038 mol or less, or 0.035 mol or less of the comonomer may be reacted based on 1 mol of ethylene. However, in consideration of the excellent effect of improving filterability by the amount control of the comonomer-derived repeating unit, 0.005 mol or more, 0.01 mol or more, 0.012 mol or more, 0.015 mol or more, 0.018 mol or more, or 0.02 mol or more of the comonomer may preferably be reacted based on 1 mol of ethylene.

Specifically, in the copolymerization step, when 10 kg/hr of ethylene is added, the comonomer is added at 10 mL/min or less, or 0 to 10 m/min to react. It may be added in the range described above in terms of allowing the comonomer-derived repeating unit to be included in the polyethylene in an optimal amount. More specifically, when 10 kg/hr of ethylene is added, the comonomer may be added at 8.0 mL/min or less, 6.0 mL/min or less, 5.0 m/min or less, 4.5 mL/min or less, 4.2 mL/min or less, 4.0 mL/min or less, 3.8 mL/min or less, 3.5 mL/min or less, 3.0 mL/min or less, or 2.6 mL/min or less to react. However, in consideration of the excellent effect of improving filterability by the amount control of the comonomer-derived repeating unit, the comonomer may be added at 0.1 mL/min or more, 0.5 mL/min or more, 1.0 mL/min or more, 1.3 mL/min or more, 1.5 mL/min or more, 1.8 mL/min or more, 1.9 mL/min or more, 2.0 mL/min or more, or 2.1 mL/min or more, when 10 kg/hr of ethylene is added.

For the polymerization reaction of the olefinic monomers, various polymerization processes known as the polymerization of olefinic monomers such as a continuous solution polymerization process, a bulk polymerization process, a suspension polymerization process, a slurry polymerization process or an emulsion polymerization process may be used.

Specifically, the polymerization may be performed at a temperature of about 25° C. to 500° C., preferably about 25° C. to 200° C., and more preferably about 50° C. to 150° C., or about 60° C. to about 100° C. In addition, the polymerization may be performed at a pressure of about 1 $kgf/cm^2$ to 100 $kgf/cm^2$, preferably about 1 $kgf/cm^2$ to 50 $kgf/cm^2$, and more preferably about 5 $kgf/cm^2$ to 30 $kgf/cm^2$.

In addition, in the polymerization reaction, the hybrid supported catalyst may be used in a dissolved or diluted state in a solvent such as pentane, hexane, heptane, nonane, decane, toluene, benzene, dichloromethane, chlorobenzene, and the like. The solvent used herein is preferably used after removing a small amount of water or air, which may adversely affect the catalyst, by treating with a small amount of alkyl aluminum.

In addition, the polymerization step may be performed by introducing hydrogen gas at about 15 ppm to about 800 ppm based on the ethylene content. Preferably, the hydrogen gas may be introduced at about 20 ppm or more, at about 25 ppm or more, at about 30 ppm or more, at about 50 ppm or more, at about 60 ppm or more, at about 80 ppm or more, at about 90 ppm or more, at about 95 ppm or more, or at about 100 ppm or more, and at about 500 ppm or less, at about 400 ppm or less, at about 350 ppm or less, at about 300 ppm or less, at about 250 ppm or less, at about 200 ppm or less, at about 180 ppm or less, at about 170 ppm or less, at about 165 ppm or less, at about 160 ppm or less, or at about 155 ppm or less based on ethylene content. For example, when 10 kg/hr of ethylene is added, hydrogen gas may be introduced at about 0.15 g/hr to about 8 g/hr, and the preferred range is as described above. More specifically, when 10 kg/hr of ethylene is added in the polymerization step, hydrogen gas may be introduced at about 1.09 g/hr to about 1.51 g/hr.

In the ethylene polymerization process, the catalyst composition including the metallocene compound of the present disclosure may exhibit high catalytic activity. For example, the catalytic activity during ethylene polymerization is calculated by a ratio of the weight of the prepared polyethylene (kg PE) to the mass of the used catalyst composition (g) per unit time (hr), and may be about 4.0 kg PE/g·cat·hr or more, or about 4.0 kg PE/g·cat·hr to about 50 kg PE/g·cat·hr. Specifically, the catalytic activity may be about 4.5 kg PE/g·cat·hr or more, about 5.0 kg PE/g·cat·hr or more, about 7 kg PE/g·cat·hr or more, 8.5 kg PE/g·cat·hr or more, about 10 kg PE/g·cat·hr or more, about 12 kg PE/g·cat·hr or more, about 13.5 kg PE/g·cat·hr or more, about 14 kg PE/g·cat·hr or more, about 15 kg PE/g·cat·hr or more, about 15.5 kg PE/g·cat·hr or more, about 16 kg PE/g·cat·hr or more, about 16.5 kg PE/g·cat·hr or more, about 17 kg PE/g·cat·hr or more, or about 18 kg PE/g·cat·hr or more. However, in terms of actual catalytic activity during ethylene polymerization, it may be about 48 kg PE/g·cat·hr or less, 45 kg PE/g·cat·hr or less, about 42 kg PE/g·cat·hr or less, about 40 kg PE/g·cat·hr or less, about 38 kg PE/g·cat·hr or less, about 35 kg PE/g·cat·hr or less, about 30 kg PE/g·cat·hr or less, or about 28 kg PE/g·cat·hr or less.

The polyethylene prepared by the method of one embodiment is characterized in that halogen substances or residual components of metal inorganic substances such as alkaline earth metals and transition metals derived from the polymerization process are not included or minimized. In addition, the melt index, melt flow rate ratio, and narrow molecular weight distribution are optimized, so that aging lifetime can be improved, the yellow index can be improved in the manufacture of bi-component fibers, and the filterability can be remarkably enhanced in the spinning process.

In particular, the polyethylene according to one embodiment of the present disclosure is characterized in that the residues of halogen compounds derived from the polymerization process are not included or minimized, so that corrosion of metal materials such as molding machines and discoloration by decomposition of the polyethylene may not occur even without the use of a neutralizing agent (acid scavenger) such as metal stearate (e.g., calcium stearate) or an extrusion aid in the extrusion process when manufacturing bi-component fibers.

Hereinafter, preferred examples are provided to aid in understanding the present invention. However, these examples are for illustrative purposes only, and the invention is not intended to be limited by these examples.

EXAMPLES

Preparation of Catalyst Precursor

Synthesis Example 1: Preparation of First Metallocene Compound

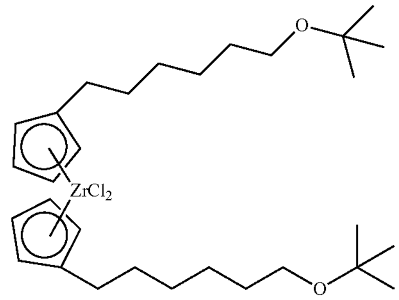

t-butyl-O—$(CH_2)_6$—Cl was prepared by the method shown in Tetrahedron Lett. 2951 (1988) using 6-chlorohexanol, and reacted with cyclopentadienyl sodium (NaCp) to obtain t-butyl-O—$(CH_2)_6$—$C_5H_5$ (yield 60%, b.p. 80° C./0.1 mmHg).

Then, t-butyl-O—$(CH_2)_6$—$C_5H_5$ was dissolved in tetrahydrofuran (THF) at −78° C. and n-butyllithium (n-BuLi) was slowly added thereto. Thereafter, it was heated to room temperature and reacted for 8 hours. The lithium salt solution synthesized as described above was slowly added to a suspension solution of $ZrCl_4(THF)_2$ (170 g, 4.50 mmol)/THF (30 mL) at −78° C., and further reacted for about 6 hours at room temperature. All volatiles were dried in vacuum and the resulting oily liquid material was filtered by adding a hexane solvent. The filtered solution was dried in vacuum, and hexane was added to obtain a precipitate at a low temperature (−20° C.). The obtained precipitate was filtered at a low temperature to obtain [tert-butyl-O—$(CH_2)_6$—$C_5H_4]_2ZrCl_2$] in the form of a white solid (yield 92%).

$^1$H-NMR (300 MHz, $CDCl_3$): δ 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H)

$^{13}$C-NMR (300 MHz, $CDCl_3$, ppm): δ 135.09, 116.66, 112.28, 72.42, 61.52, 30.66, 30.31, 30.14, 29.18, 27.58, 26.00

Synthesis Example 2: Preparation of Second Metallocene Compound

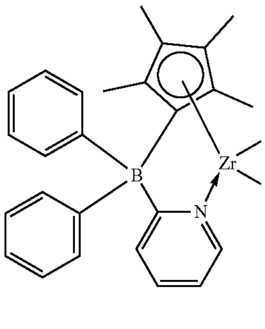

After dissolving 2-bromopyridine (1 eq.) in tetrahydrofuran (0.1 M), n-butyllithium (1 eq.) was slowly added dropwise at −90° C., followed by stirring at the same temperature for 1 hour. Thereafter, chlorodiphenylborane (1 eq.) was dissolved in toluene (0.3 M), and slowly added dropwise to the first reactant at −78° C., followed by stirring for 1 hour. After stirring at room temperature for 12 hours, the solvent was vacuum dried, toluene was added, and the residue from which the solid was removed through a filter was vacuum dried to obtain diphenyl(pyridin-2-yl)borane.

After dissolving the diphenyl(pyridin-2-yl)borane (1 eq.) in tetrahydrofuran (0.1 M), a solution in which lithium tetramethylcyclopentadienide ($Li(CpMe_4)$, 1 eq.) was dissolved in tetrahydrofuran (0.1 M) was slowly added dropwise at 0° C., followed by stirring at room temperature overnight. Thereafter, the solvent was vacuum dried, and then toluene/diethyl ether (3/1 by volume, 0.3 M) was added and dissolved. Then, $MCl_4$ (1 eq.) was mixed with toluene (0.2 M) and added at −78° C., followed by stirring at room temperature overnight. After completion of the reaction, the solvent was vacuum dried, dichloromethane was added to remove salts through a filter, etc., and the filtrate was vacuum dried and recrystallized by adding dichloromethane/hexane. The resulting solid was filtered and vacuum dried to obtain dichloro{diphenyl(pyridin-2-yl-κN)($\eta^5$-2,3,4,5-tetramethylcyclopenta-2,4-dien-1-ylidene)borate}zirconium (IV).

Dichloro{diphenyl(pyridin-2-yl-κN)($\eta^5$-2,3,4,5-tetramethylcyclopenta-2,4-dien-1-ylidene)borate}zirconium(IV) (1 eq.) was dissolved in toluene/diethyl ether (3/1 by volume, 0.3 M), and then a solution in which methyl lithium (2 eq.) was dissolved in hexane or diethyl ether was slowly added dropwise at −78° C., followed by stirring at room temperature for 12 hours. After completion of the reaction, the solvent was vacuum dried, dichloromethane was added to remove salts through a filter, etc., and the filtrate was vacuum dried and recrystallized by adding dichloromethane/hexane. The resulting solid was filtered and vacuum dried to obtain a precursor compound.

$^1$H NMR (500 MHz, $CDCl_3$, ppm): δ 8.32 (d, 1H), 8.05 (d, 4H), 7.70 (t, 1H), 7.42 (t, 1H), 7.40 (t, 4H), 7.23 (d, 1H), 7.17 (t, 2H), 2.08 (s, 6H), 1.93 (s, 6H) 0.95 (s, 6H)

Preparation of Hybrid Supported Catalyst

Preparation Example 1

A hybrid supported metallocene catalyst was prepared by using the first metallocene compound of Synthesis Example 1, the second metallocene compound of Synthesis Example 2, silica (manufactured by Grace, product name: SP952X_1836, calcined at 600° C.) as a support, methylaluminoxane as a first cocatalyst, and N,N-dimethylanilinium tetrakis(pentafluorophenyl)borate as a second cocatalyst. At this time, 8 mmol/g-$SiO_2$ of methylaluminoxane as the first cocatalyst, 0.1 mmol/g-$SiO_2$ of the first metallocene compound of Synthesis Example 1, 0.05 mmol/g-$SiO_2$ of the second metallocene compound of Synthesis Example 2, and 0.2 mmol/g-$SiO_2$ of N,N-dimethylanilinium tetrakis(pentafluorophenyl)borate as a second cocatalyst were used.

Specifically, 100 mL of a toluene solution was put into a glass reactor, and 10 g of the prepared silica was added thereto, followed by stirring while raising the temperature of the reactor to 60° C. After the silica was sufficiently dispersed, the first metallocene compound of Synthesis Example 1 was added and stirred for 2 hours. Stirring was stopped, 53.1 mL of a methylaluminoxane (MAO)/toluene solution was added, followed by stirring at 80° C. at 200 rpm for 16 hours. Thereafter, the temperature was lowered to 40° C. and the mixture was washed with a sufficient amount of toluene to remove unreacted aluminum compounds.

Then, 100 mL of toluene was added, and the second metallocene compound of Synthesis Example 2 was added, followed by stirring for 2 hours. At this time, each of the first metallocene compound of Synthesis Example 1 and the second metallocene compound of Synthesis Example 2 was dissolved in 20 mL of toluene in advance, and then added as a solution.

Thereafter, N,N-dimethylanilinium-tetrakis(pentafluorophenyl)borate was dissolved in 50 mL of toluene with the same number of moles as described above, and then put into a reactor containing the supported catalyst (silica in which methylaluminoxane and two metallocene catalysts were supported). In addition, about 50 mL of toluene was further added to the reactor to adjust the total solution amount to about 150 mL, and then stirred at 80° C. for 1 hour at 200 rpm. Thereafter, when the catalyst subsides, the toluene layer was separated and removed, and the remaining toluene was removed under reduced pressure at 40° C.

Then, the mixed solution was further stirred for about 2 hours to react. After the reaction was completed, stirring was stopped, the toluene layer was separated and removed, and the remaining toluene was removed under reduced pressure at 40° C., thereby preparing a hybrid supported metallocene catalyst of Preparation Example 1.

Preparation Example 2

A hybrid supported catalyst was prepared in the same manner as in Preparation Example 1, except that 0.4 mmol/g-$SiO_2$ of N,N-dimethylaniliniumtetrakis(pentafluorophenyl)borate, which is the second cocatalyst, was used.

Comparative Preparation Example 1

A supported catalyst was prepared in the same manner as in Preparation Example 1, except that 0.15 mmol/g-$SiO_2$ of the first metallocene compound of Synthesis Example 1 was supported alone and the second metallocene compound was not used.

Comparative Preparation Example 2

A silica-supported metallocene catalyst of Comparative Preparation Example 2 was prepared in the same manner as in Comparative Preparation Example 1, except for using the metallocene compound of the following Chemical Formula A instead of the metallocene compound of Synthesis Example 1.

[Chemical Formula A]

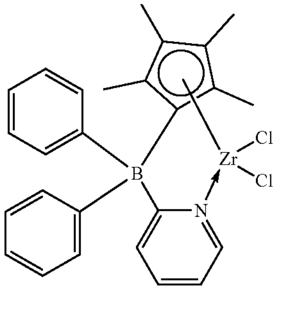

Preparation of Polyethylene

Example 1

In a 220 L reactor of a pilot plant, the hybrid supported catalyst prepared in Preparation Example 1 was put into a single slurry polymerization process to prepare a high-density polyethylene according to a conventional method. 10 kg/hr of ethylene and 0.5 g/hr of hydrogen were continuously reacted in a hexane slurry state at a reactor temperature of 80° C. At this time, 5 mL/min of 1-butene was added as a comonomer. After the reaction, a high-density polyethylene in the form of powder was prepared after performing a solvent removal process and a drying process.

1,000 ppm of an antioxidant (Irgafos 168, CIBA) was added to the high-density polyethylene obtained above, and granulated at an extrusion temperature of 170° C. to 220° C. using a twin screw extruder (W & P Twin Screw Extruder, (Φ=75, L/D=36). Herein, the antioxidant content is a value based on the weight of the high-density polyethylene.

Example 2

A high-density polyethylene was prepared in the same manner as in Example 1, except that the hybrid supported catalyst of Preparation Example 2 was used.

Example 3

A high-density polyethylene was prepared in the same manner as in Example 1, except that 10 kg/hr of ethylene and 1 g/hr of hydrogen were introduced.

Comparative Example 1

A high-density polyethylene was prepared in the same manner as in Example 1, except that the supported catalyst of Comparative Preparation Example 1 was used.

Comparative Example 2

A polyethylene product (ASPUN 6850A, manufactured by DOW) for preparing fibers prepared by using a Ziegler-Natta catalyst was used as the polyethylene of Comparative Example 2. Herein, ASPUN 6850A was a product containing 1000 ppm of an antioxidant (Irgafos 168, manufactured by CIBA) and 500 ppm of a neutralizing agent (SC110, Ca-St, manufactured by Doobon). Herein, the antioxidant content and the neutralizing agent content are values based on the weight of the high-density polyethylene.

Comparative Example 3

A polyethylene product (ASPUN 6835A, manufactured by DOW) for preparing fibers prepared by using a Ziegler-Natta catalyst was used as the polyethylene of Comparative Example 3. Herein, ASPUN 6835A was a product containing 1000 ppm of an antioxidant (Irgafos 168, manufactured by CIBA) and 1000 ppm of a neutralizing agent (SC110, Ca-St, manufactured by Doobon). Herein, the antioxidant content and the neutralizing agent content are values based on the weight of the high-density polyethylene.

Comparative Example 4

A high-density polyethylene was prepared in the same manner as in Example 1, except that the supported catalyst of Comparative Preparation Example 1 was used.

Test Example 1: Evaluation of Physical Properties of Polyethylene

For the polyethylene prepared in Examples and Comparative Examples, physical property evaluation and residue analysis were performed in the following manner, and the results are shown in Table 1 below.

(1) Catalytic Activity (Kg PE/g·Cat·Hr)

It was calculated as a ratio of the weight of the prepared polyethylene (kg PE) to the content of the used supported catalyst (g Cat) per unit time (h).

In Table 1 below, "<15" indicates that the catalytic activity was measured to be "less than 15 kg PE/g·cat·hr".

(2) Melt Index (MI)

The melt index ($MI_{2.16}$, $MI_5$) was measured at a temperature of 190° C. under a load of 2.16 kg and 5 kg, respectively, according to ASTM D 1238 (condition E), and expressed as the weight (g) of the polymer melted for 10 minutes.

(3) Melt Flow Rate Ratio (MFRR)

The melt flow rate ratio (MFRR, $MI_5/MI_{2.16}$) is a ratio of $MI_5$ (MI, 5 kg load) divided by $MI_{2.16}$ (MI, 2.16 kg load).

(4) Molecular Weight Distribution (PDI, Polydispersity Index, Mw/Mn)

The molecular weight distribution (PDI, Mw/Mn) was calculated by measuring a weight average molecular weight (Mw) and a number average molecular weight (Mn) using gel permeation chromatography (GPC, manufactured by Water), and then dividing the weight average molecular weight by the number average molecular weight.

Specifically, PL-GPC220 manufactured by Waters was used as the gel permeation chromatography (GPC) instrument, and a Polymer Laboratories PLgel MIX-B 300 mm length column was used. An evaluation temperature was 160° C., and 1,2,4-trichlorobenzene was used for a solvent at a flow rate of 1 mL/min. Each polymer sample was pretreated by dissolving in 1,2,4-trichlorobenzene containing 0.0125% of BHT at 160° C. for 10 hours using a GPC analyzer (PL-GP220), and the sample with a concentration of 10 mg/10 mL was supplied in an amount of 200 μL. Mw and Mn were obtained using a calibration curve formed using a polystyrene standard. 9 kinds of the polystyrene standard were used with the molecular weight of 2000 g/mol, 10000 g/mol, 30000 g/mol, 70000 g/mol, 200000 g/mol, 700000 g/mol, 2000000 g/mol, 4000000 g/mol, and 10000000 g/mol.

(5) Density

The density ($g/cm^3$) of the polyethylene was measured in accordance with ASTM D 1505.

(6) Polymer Residue Analysis

For the polyethylene according to Examples and Comparative Examples, residues in the polymer were analyzed in the following manner.

Specifically, the polyethylene was heated at 200° C. for 1 hour, heated at 400° C. for 2 hours, and then heated at 650° C. for 3 hours. Thereafter, inorganic substances such as alkaline earth metals, transition metals, and silicon were analyzed by inductively coupled plasma (ICP) spectroscopy.

1. Analysis of Inorganic Substances: ICP-OES (Optima 8300DV)

1) About 1 g to 2 g of a sample was aliquoted into a platinum crucible, and the weight was accurately measured.

2) For decomposition of organic substances, the sample was heated slowly in an electric furnace to carbonize.

Step 1: 200° C., 1 hr, Step 2: 400° C., 2 hr, Step 3: 650° C., 3 hr 3) 1 mL of nitric acid and 10 μL of hydrofluoric acid were added to the residue and sealed with parafilm.

4) After adding 1 mL of a supersaturated boric acid solution, 200 μL of 1000 mg/kg Sc internal standard was added, and the mixture was diluted with ultrapure water so that the total amount was 20 mL.

5) It was measured by ICP-OES.

In addition, halogen substances such as chlorine (Cl) were analyzed by combustion ion chromatography at a combustion temperature of 900° C. to 1000° C.

2. Cl Content Analysis: Combustion Ion Chromatography (ICS-2100/AQF-2100H)

1) Combustion temperature: Inlet temperature 900° C., Outlet temperature 1000° C.

2) Gas flow rate: Ar gas 200 m/min, 02 gas 400 mL/min

3) Humidification amount: 0.23 mL/min, internal standard ($PO_4^{3-}$): 20 mg/kg 4) Absorbent (HO2), absorbent volume: 5 mL, final dilution volume: 10 mL 5) Column: IonPac AS18 (4×250 mm)

6) Eluent type: KOH (30.5 mM), Eluent flow rate: 1 mL/min

7) Detector: Suppressed Conductivity Detector, SRS Current: 76 mA

8) Injection volume: 100 μL, Isocratic/Gradient condition: Isocratic

9) About 0.04 g of the sample was accurately measured on the sample boat.

10) The sample was measured by combustion IC.

In Table 1 below, "<10" indicates that the content of the component was measured to be "less than 10 ppm", and "N.D" indicates that the component was "not detected".

TABLE 1

| | Measurement result of physical properties | | | | | Residue analysis | | | | | |
|---|---|---|---|---|---|---|---|---|---|---|---|
| | Activity (kgPE/gCat · hr) | $MI_{2.16}$ (g/10 min) | MFRR | PDI (Mw/Mn) | Density ($g/cm^3$) | Ca (ppm) | Mg (ppm) | Si (ppm) | Ti (ppm) | Zr (ppm) | Cl (ppm) |
| Example 1 | 25.3 | 18.9 | 2.53 | 2.39 | 0.954 | N.D | N.D | 28 | N.D | N.D | 1 |
| Example 2 | 24.2 | 20 | 2.50 | 2.38 | 0.951 | N.D | N.D | 29 | N.D | N.D | 1 |
| Example 3 | 18.3 | 29.7 | 2.54 | 2.35 | 0.951 | N.D | N.D | 30 | N.D | N.D | 1 |
| Comparative Example 1 | <15 | 19.5 | 2.52 | 2.46 | 0.953 | 1 | N.D | 30 | N.D | 1 | <10 |

TABLE 1-continued

| | Measurement result of physical properties | | | | | Residue analysis | | | | | |
|---|---|---|---|---|---|---|---|---|---|---|---|
| | Activity (kgPE/ gCat · hr) | $MI_{2.16}$ (g/10 min) | MFRR | PDI (Mw/ Mn) | Density (g/cm[3]) | Ca (ppm) | Mg (ppm) | Si (ppm) | Ti (ppm) | Zr (ppm) | Cl (ppm) |
| Comparative Example 2 | — | 28.1 | 2.70 | 2.64 | 0.954 | 25 | 110 | <10 | 2 | N.D | 50 |
| Comparative Example 3 | — | 17.5 | 2.71 | 2.79 | 0.950 | 75 | 13 | <10 | 4 | N.D | 50 |
| Comparative Example 4 | <15 | 15.1 | 2.55 | 2.56 | 0.953 | 2 | 1 | 52 | N.D | 2 | <10 |

The polyethylene of Examples 1 to 3 was prepared by applying a hybrid supported metallocene catalyst containing specific metallocene compounds and a borate compound as a second cocatalyst in a controlled content without using a separate neutralizing agent. Accordingly, as shown in Table 1 above, alkaline earth metals such as calcium (Ca) and magnesium (Mg) and transition metal components such as titanium (Ti) and zirconium (Zr) were not detected at all (N.D), and halogens such as chlorine (Cl) were only detected in a minimum amount of 1 ppm. In addition, the polyethylene had higher catalytic activity than before, and the melt index ($MI_{2.16}$, ASTM D1238, 190° C., 2.16 kg) and the melt flow rate ratio (MFRR, $MI_5/MI_{2.16}$) were secured in the optimal range.

Test Example 2: Physical Properties of Polyethylene Products

An injection-molded specimen was prepared using the polyethylene prepared in one of Examples and Comparative Examples. The properties and filterability thereof were evaluated in the following manner, and the results are shown in Table 2.

Specifically, the physical properties measured after preparing a specimen by injection molding using the polyethylene prepared in one of Examples and Comparative Examples are expressed as the measured values before aging evaluation (day 0), and the physical properties measured after storage in an air convection oven at 80° C. for 10 days are expressed as the measured values after aging evaluation (day 10).

(1) Yellow Index (Y.I.)

In order to confirm the degree of discoloration appearing after oxidation for a certain period of time, the yellow index (Y.I) was measured using a COH-400 spectrophotometer (NIPPON DENSHOKU INDUSTRIES) according to ASTM E 313.

(2) Spinning Processing Load Test (Filterability Test)

Each polyethylene prepared in one of Examples 1 to 3 and Comparative Examples 1 to 3 was extruded, and an extruder die pressure increasing rate test (4 hrs, #500, 25 kg/hr) was performed. The more screen pack plugging in the process line, the higher the die pressure. Thus, the filterability, i.e., spinning processing load, was defined as the die pressure increasing rate, and this was measured. Specifically, a die pressure increment ($\Delta P$) over extrusion test time period ($\Delta t$) was measured, and the die pressure increasing rate, i.e., filterability was calculated.

(3) Tensile Strength (MPa)

In order to confirm the degree of decrease in tensile strength after a certain period of time, the tensile strength (MPa) was measured according to ASTM D 638. Specifically, it can be measured according to the method specified in ASTM D 638 using a specimen having a thickness of 6.4 mm at room temperature (23° C.) under the condition of a tensile rate of 50 mm/min.

TABLE 2

| | Y.I.(0) before aging | Y.I.(10) after aging | Filterability (bar/hr) | Tensile strength before aging (0, MPa) | Tensile strength after aging (10, MPa) |
|---|---|---|---|---|---|
| Example 1 | −6.79 | −6.64 | 3.1 | 36.0 | 33.8 |
| Example 2 | −6.67 | −6.42 | 2.8 | 34.6 | 31.3 |
| Example 3 | −5.05 | −4.95 | 2.7 | 28.3 | 25.9 |
| Comparative Example 1 | −4.53 | −1.78 | 3.9 | 26.1 | 20.8 |
| Comparative Example 2 | 0.25 | 3.23 | 4.7 | 24.7 | 19.2 |
| Comparative Example 3 | 0.25 | 1.52 | 5.3 | 24.7 | 15.6 |
| Comparative Example 4 | −4.76 | −2.03 | 3.7 | 27.4 | 21.7 |

As shown in Table 2, Examples minimized both the alkaline earth metal and transition metal residues and halogen substances in polyethylene while optimizing the melt index and melt flow rate ratio, so that the aging lifetime was improved compared to Comparative Examples, and a fiber product with enhanced yellow index and filterability in the spinning process could be manufactured.

However, as Comparative Examples 1 and 4 were prepared by using a single supported metallocene catalyst, the tensile strength after aging was greatly reduced, and the chlorine residual content was high, so discoloration occurred and a high tenacity fiber could not be manufactured. In addition, as Comparative Examples 2 and 3 were prepared by using a Ziegler-Natta catalyst, chlorine residues were included, which could cause corrosion of metal materials such as molding machines, and promote the decomposition reaction of polyethylene, resulting in discoloration. In particular, Comparative Example 3 was prepared by increasing the antioxidant content as an extrusion aid, so the discoloration was reduced, but the tensile strength after aging was greatly reduced due to Ca residues, and a high tenacity fiber could not be manufactured.

The invention claimed is:

1. A polyethylene satisfying the following:

a melt index measured at a temperature, 190° C., under a load of 2.16 kg according to ASTM D 1238 is 15 g/10 min to 40 g/10 min, a melt flow rate ratio (MFRR) is 3 or less, wherein the melt flow rate ratio (MFRR) is calculated by dividing a melt index measured at 190° C. under a load of 5 kg ($MI_5$) by a melt index measured at 190° C. under a load of 2.16 kg ($MI_{2.16}$), a content of alkaline earth metals and transition metals measured by inductively coupled plasma (ICP) spectroscopy is 0.8 ppm or less, and a halogen content measured by combustion ion chromatography (IC) is 5 ppm or less.

2. The polyethylene of claim 1, wherein the melt index is 18 g/10 min to 33 g/10 min.

3. The polyethylene of claim 1, wherein the melt flow rate ratio (MFRR) is 2 to 3.

4. The polyethylene of claim 1, wherein a molecular weight distribution (Mw/Mn) is 2.0 to 2.6.

5. The polyethylene of claim 1, wherein a density measured at a temperature 23° C. according to ASTM D 1505 is 0.945 $g/cm^3$ to 0.965 $g/cm^3$.

6. The polyethylene of claim 1, wherein the polyethylene is a copolymer of ethylene; and at least one comonomer selected from the group consisting of propylene, 1-butene, 1-hexene, 4-methyl-1-pentene, and 1-octene.

7. A method for preparing the polyethylene according to claim 1, comprising polymerizing one or more olefinic monomers in presence of a hybrid supported metallocene catalyst, wherein the hybrid supported metallocene catalyst comprises a first cocatalyst, at least one first metallocene compound represented by Chemical Formula 1, at least one second metallocene compound represented by Chemical Formula 2, and a second cocatalyst, all of which are supported on a support, and wherein the hybrid supported metallocene catalyst is prepared by:

supporting the first metallocene compound of Chemical Formula 1 on the support;

supporting the first cocatalyst on the support;

supporting the second metallocene compound of Chemical Formula 2 on the support; and supporting the second cocatalyst on the support:

[Chemical Formula 1]

$$(Cp^1R^a)_n(Cp^2R^b)M^1Z^1_{3-n}$$

wherein in Chemical Formula 1, $M^1$ is a Group 4 transition metal;

$Cp^1$ and $Cp^2$ are the same as or different from each other, and each independently is any one selected from the group consisting of cyclopentadienyl, indenyl, 4,5,6,7-tetrahydro-1-indenyl, and fluorenyl radical, wherein $Cp^1$ and $Cp^2$ are optionally substituted with $C_{1-20}$ hydrocarbon;

$R^a$ and $R^b$ are the same as or different from each other, and each independently is hydrogen, substituted or unsubstituted $C_{1-20}$ alkyl, substituted or unsubstituted $C_{1-10}$ alkoxy, substituted or unsubstituted $C_{2-20}$ alkoxyalkyl, substituted or unsubstituted $C_{6-20}$ aryl, substituted or unsubstituted $C_{6-10}$ aryloxy, substituted or unsubstituted $C_{2-20}$ alkenyl, substituted or unsubstituted $C_{7-40}$ alkylaryl, substituted or unsubstituted $C_{7-40}$ arylalkyl, substituted or unsubstituted $C_{8-40}$ arylalkenyl, or substituted or unsubstituted $C_{2-10}$ alkynyl;

Z1 are each independently a halogen atom, substituted or unsubstituted $C_{1-20}$ alkyl, substituted or unsubstituted $C_{2-10}$ alkenyl, substituted or unsubstituted $C_{7-40}$ alkylaryl, substituted or unsubstituted $C_{7-40}$ arylalkyl, substituted or unsubstituted $C_{6-20}$ aryl, substituted or unsubstituted $C_{1-20}$ alkylidene, substituted or unsubstituted amino, substituted or unsubstituted $C_{2-20}$ alkylalkoxy, or substituted or unsubstituted $C_{7-40}$ arylalkoxy; and n is 1 or 0;

[Chemical Formula 2]

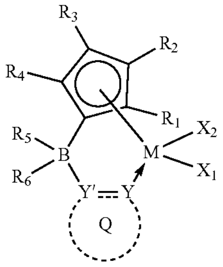

wherein in Chemical Formula 2,

B is boron,

M is a group 4 transition metal, $R_1$ to $R_4$ are each independently hydrogen, substituted or unsubstituted $C_{1-20}$ alkyl, substituted or unsubstituted $C_{3-20}$ cycloalkyl, or substituted or unsubstituted $C_{6-20}$ aryl, or $R_1$ and $R_2$ or $R_3$ and $R_4$ are bonded to each other to form a substituted or unsubstituted $C_{6-60}$ aromatic ring, $R_5$ and $R_6$ are each independently substituted or unsubstituted $C_{1-20}$ alkyl, substituted or unsubstituted $C_{3-20}$ cycloalkyl, or substituted or unsubstituted $C_{6-20}$ aryl, or $R_5$ and $R_6$ are bonded to each other to form a substituted or unsubstituted $C_{3-60}$ aliphatic ring or a substituted or unsubstituted $C_{6-60}$ aromatic ring, $X_1$ and $X_2$ are each independently substituted or unsubstituted $C_{1-20}$ alkyl or —O (CO)R', wherein R' is C1-20 alkyl, Q is a substituted or unsubstituted $C_{2-60}$ heterocyclic ring containing at least one selected from the group consisting of N, O and S, Y and Y' are elements constituting Q, Y is N, O, or S, and Y' is an element of Q and adjacent to Y, and Y' is N or C.

8. The method for preparing the polyethylene of claim 7, wherein the first metallocene compound and the second metallocene compound are supported on the support in a molar ratio of 3:1 to 1:10.

9. The method for preparing the polyethylene of claim 7, wherein the second cocatalyst comprises a borate-based cocatalyst, and a molar ratio of a total metal contained in the hybrid supported metallocene catalyst to boron contained in the second cocatalyst is 1:0.45 to 1:3.

10. The method for preparing the polyethylene of claim 7, wherein the first cocatalyst comprises at least one selected from compounds represented by Chemical Formulae 3 and 4:

[Chemical Formula 3]

$$—[Al(R_{31})—O]_m—$$

wherein in Chemical Formula 3, $R_{31}$ are the same as or different from each other, and each independently halogen; or $C_{1-20}$ hydrocarbyl substituted or unsubstituted with halogen; and m is an integer of 2 or more,

[Chemical Formula 4]

$$D(R_{41})_3$$

wherein in Chemical Formula 4,

D is aluminum or boron, and $R_{41}$ are the same as or different from each other, and each independently halogen; or $C_{1-20}$ hydrocarbyl substituted or unsubstituted with halogen.

11. The method for preparing the polyethylene of claim 7, wherein the second cocatalyst comprises a borate compound represented by Chemical Formula 5 or Chemical Formula 6:

[Chemical Formula 5]

$$[L-H]^+[ZA_4]^-$$

[Chemical Formula 6]

$$[L]^+[ZA_4]^-$$

wherein in Chemical Formulae 5 and 6,

L are each independently a neutral or cationic Lewis base;

H is a hydrogen atom;

Z are each independently boron; and

A are the same as or different from each other, and each independently $C_{6-20}$ aryl or $C_{1-20}$ alkyl, wherein the $C_{6-20}$ aryl or $C_{1-20}$ alkyl is unsubstituted or substituted with at least one substituent selected from the group consisting of halogen, $C_{1-20}$ alkyl, $C_{1-20}$ alkoxy and $C_{6-20}$ aryloxy.

12. The method for preparing the polyethylene of claim 7, wherein the second cocatalyst includes trimethylammonium tetrakis(pentafluorophenyl)borate, triethylammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-(triisopropylsilyl)-2,3,5,6-tetrafluorophenyl)borate, N,N-dimethylanilinium pentafluorophenoxytris (pentafluorophenyl)borate, N,N-dimethyl-2,4,6-trimethylanilinium tetrakis(pentafluorophenyl)borate, trimethylammonium tetrakis (2,3,4,6-tetrafluorophenyl)borate, N,N-dimethylanilinium tetrakis(2,3,4,6-tetrafluorophenyl)borate, hexadecyldimethylammonium tetrakis(pentafluorophenyl)borate, N-methyl-N-dodecylanilinium tetrakis(pentafluorophenyl)borate, or methyldi(dodecyl)ammonium tetrakis(pentafluorophenyl)borate.

* * * * *